United States Patent
Wasser et al.

(10) Patent No.: US 9,916,621 B1
(45) Date of Patent: Mar. 13, 2018

(54) PRESENTATION OF CREDIT SCORE FACTORS

(71) Applicant: CONSUMERINFO.COM, INC., Costa Mesa, CA (US)

(72) Inventors: Jeremy Wasser, Los Angeles, CA (US); Michelle Felice-Steele, Los Angeles, CA (US); Melinda Nies, Arvada, CO (US); Luke Giltner, Denver, CO (US)

(73) Assignee: CONSUMERINFO.COM, INC., Costa Mesa, CA (US)

( * ) Notice: Subject to any disclaimer, the term of this patent is extended or adjusted under 35 U.S.C. 154(b) by 0 days.

(21) Appl. No.: 13/797,011

(22) Filed: Mar. 12, 2013

Related U.S. Application Data

(60) Provisional application No. 61/732,244, filed on Nov. 30, 2012.

(51) Int. Cl.
G06Q 40/02 (2012.01)

(52) U.S. Cl.
CPC .................................. *G06Q 40/025* (2013.01)

(58) Field of Classification Search
CPC ................................................... G06Q 40/025
USPC ...................................... 705/35–45
See application file for complete search history.

(56) References Cited

U.S. PATENT DOCUMENTS

| | | | |
|---|---|---|---|
| 3,316,395 A | 4/1967 | Lavin et al. | |
| 4,736,294 A | 4/1988 | Gill | |
| 4,812,628 A | 3/1989 | Boston et al. | |
| 4,876,592 A | 10/1989 | Von Kohorn | |
| 4,895,518 A | 1/1990 | Arnold | |
| 4,947,028 A | 8/1990 | Gorog | |
| 5,034,807 A | 7/1991 | Von Kohorn | |
| 5,201,010 A | 4/1993 | Deaton et al. | |
| 5,259,766 A | 11/1993 | Sack | |
| 5,262,941 A | 11/1993 | Saladin | |
| 5,274,547 A | 12/1993 | Zoffel et al. | |
| 5,590,038 A | 12/1996 | Pitroda | |
| 5,611,052 A | 3/1997 | Dykstra et al. | |
| 5,615,408 A | 3/1997 | Johnson | |
| 5,640,577 A | 6/1997 | Scharmer | |
| 5,704,029 A | 12/1997 | Wright, Jr. | |
| 5,732,400 A | 3/1998 | Mandler | |
| 5,774,883 A | 6/1998 | Andersen | |
| 5,793,972 A | 8/1998 | Shane | |
| 5,844,218 A | 12/1998 | Kawan et al. | |

(Continued)

FOREIGN PATENT DOCUMENTS

| | | |
|---|---|---|
| EP | 0 869 652 | 10/1998 |
| EP | 0 913 789 | 5/1999 |

(Continued)

OTHER PUBLICATIONS

U.S. Appl. No. 12/705,489, filed Feb. 12, 2010, Bargoli et al.

(Continued)

*Primary Examiner* — Jessica Lemieux
(74) *Attorney, Agent, or Firm* — Knobbe Martens Olson & Bear LLP

(57) ABSTRACT

A score factor system that may generate a score factor user interface that displays summary credit information for a particular consumer in selected credit categories. The system constructs flippable score factor interfaces for such display that, when touched, may be reversed to display explanatory text on how the corresponding credit category affects their credit report.

18 Claims, 10 Drawing Sheets

(56) References Cited

U.S. PATENT DOCUMENTS

| | | |
|---|---|---|
| 5,875,236 A | 2/1999 | Jankowitz |
| 5,878,403 A | 3/1999 | DeFrancesco |
| 5,884,287 A | 3/1999 | Edesess |
| 5,903,830 A | 5/1999 | Joao et al. |
| 5,930,764 A | 7/1999 | Melchione et al. |
| 5,930,776 A | 7/1999 | Dykstra et al. |
| 5,940,812 A | 8/1999 | Tengel et al. |
| 5,950,172 A | 9/1999 | Klingman |
| 5,956,693 A | 9/1999 | Geerlings |
| 5,966,695 A | 10/1999 | Melchione et al. |
| 5,995,947 A | 11/1999 | Fraser et al. |
| 5,999,596 A | 12/1999 | Walker et al. |
| 6,029,149 A | 2/2000 | Dykstra et al. |
| 6,038,551 A | 3/2000 | Barlow et al. |
| 6,064,987 A | 5/2000 | Walker |
| 6,070,141 A | 5/2000 | Houvener |
| 6,088,686 A | 7/2000 | Walker et al. |
| 6,094,643 A | 7/2000 | Anderson et al. |
| 6,105,007 A | 8/2000 | Norris |
| 6,115,690 A | 9/2000 | Wong |
| 6,128,599 A | 10/2000 | Walker |
| 6,128,603 A | 10/2000 | Dent |
| 6,185,543 B1 | 2/2001 | Galperin et al. |
| 6,202,053 B1 | 3/2001 | Christiansen et al. |
| 6,208,979 B1 | 3/2001 | Sinclair |
| 6,236,977 B1 | 5/2001 | Verba et al. |
| 6,249,770 B1 | 6/2001 | Erwin et al. |
| 6,311,169 B2 | 10/2001 | Duhon |
| 6,324,524 B1 | 11/2001 | Lent et al. |
| 6,330,575 B1 | 12/2001 | Moore |
| 6,353,778 B1 | 3/2002 | Brown |
| 6,405,173 B1 | 6/2002 | Honarvar |
| 6,405,181 B2 | 6/2002 | Lent et al. |
| 6,513,018 B1 | 1/2003 | Culhane |
| 6,567,791 B2 | 5/2003 | Lent et al. |
| 6,581,025 B2 | 6/2003 | Lehman |
| 6,611,816 B2 | 8/2003 | Lebda et al. |
| 6,622,131 B1 | 9/2003 | Brown et al. |
| 6,658,393 B1 | 12/2003 | Basch et al. |
| 6,703,930 B2 | 3/2004 | Skinner |
| 6,792,088 B2 | 9/2004 | Takeuchi |
| 6,804,346 B1 | 10/2004 | Mewhinney |
| 6,901,406 B2 | 5/2005 | Nabe et al. |
| 6,910,624 B1 | 6/2005 | Natsuno |
| 6,950,807 B2 | 9/2005 | Brock |
| 6,959,281 B1 | 10/2005 | Freeling et al. |
| 6,962,336 B2 | 11/2005 | Glass |
| 6,985,887 B1 | 1/2006 | Sunstein et al. |
| 6,988,085 B2 | 1/2006 | Hedy |
| 7,028,052 B2 | 4/2006 | Chapman et al. |
| 7,058,386 B2 | 6/2006 | McGregor et al. |
| 7,076,462 B1 | 7/2006 | Nelson et al. |
| 7,076,475 B2 | 7/2006 | Honarvar |
| 7,089,594 B2 | 8/2006 | Lal et al. |
| 7,133,935 B2 | 11/2006 | Hedy |
| 7,143,063 B2 | 11/2006 | Lent |
| 7,249,076 B1 | 7/2007 | Pendleton et al. |
| 7,275,083 B1 | 9/2007 | Seibel et al. |
| 7,280,980 B1 | 10/2007 | Hoadley et al. |
| 7,330,717 B2 | 2/2008 | Gidron et al. |
| 7,337,133 B1 | 2/2008 | Bezos et al. |
| 7,337,468 B2 | 2/2008 | Metzger |
| 7,366,694 B2 | 4/2008 | Lazerson |
| 7,409,369 B1 | 8/2008 | Homuth et al. |
| 7,451,113 B1 | 11/2008 | Kasower |
| 7,472,088 B2 | 12/2008 | Taylor et al. |
| 7,505,939 B2 | 3/2009 | Lent et al. |
| 7,529,698 B2 | 5/2009 | Joao |
| 7,542,993 B2 | 6/2009 | Satterfield et al. |
| 7,552,086 B1 | 6/2009 | Rajasekar et al. |
| 7,571,139 B1 | 8/2009 | Giordano et al. |
| 7,580,856 B1 | 8/2009 | Pliha |
| 7,584,146 B1 | 9/2009 | Duhon |
| 7,590,589 B2 | 9/2009 | Hoffberg |
| 7,593,889 B2 | 9/2009 | Raines et al. |
| 7,593,891 B2 | 9/2009 | Kornegay et al. |
| 7,610,229 B1 | 10/2009 | Kornegay |
| 7,610,257 B1 | 10/2009 | Abrahams |
| 7,653,592 B1 | 1/2010 | Flaxman et al. |
| 7,689,505 B2 | 3/2010 | Kasower |
| 7,690,032 B1 | 3/2010 | Peirce |
| 7,711,635 B2 | 5/2010 | Steele et al. |
| 7,711,636 B2 | 5/2010 | Robida et al. |
| 7,747,559 B2 | 6/2010 | Leitner et al. |
| 7,774,257 B2 | 8/2010 | Maggioncalda et al. |
| 7,774,270 B1 | 8/2010 | MacCloskey |
| 7,788,147 B2 | 8/2010 | Haggerty et al. |
| 7,792,715 B1 | 9/2010 | Kasower |
| 7,814,004 B2 | 10/2010 | Haggerty et al. |
| 7,814,005 B2 | 10/2010 | Imrey et al. |
| 7,818,228 B1 | 10/2010 | Coulter |
| 7,840,484 B2 | 11/2010 | Haggerty et al. |
| 7,853,493 B2 | 12/2010 | DeBie et al. |
| 7,856,203 B2 | 12/2010 | Lipovski |
| 7,877,304 B1 | 1/2011 | Coulter |
| 7,890,420 B2 | 2/2011 | Haggerty et al. |
| 7,904,306 B2 | 3/2011 | Johnson et al. |
| 7,925,582 B1 | 4/2011 | Kornegay et al. |
| 7,941,365 B1 | 5/2011 | Bradley et al. |
| 7,945,510 B1 | 5/2011 | Bradley et al. |
| 7,962,404 B1 | 6/2011 | Metzger, II et al. |
| 7,970,676 B2 | 6/2011 | Feinstein |
| 7,970,679 B2 | 6/2011 | Kasower |
| 7,991,689 B1 | 8/2011 | Brunzell et al. |
| 8,001,042 B1 | 8/2011 | Brunzell et al. |
| 8,015,107 B2 | 9/2011 | Kornegay et al. |
| 8,036,979 B1 | 10/2011 | Torrez et al. |
| 8,073,768 B2 | 12/2011 | Haggerty et al. |
| 8,078,524 B2 | 12/2011 | Crawford et al. |
| 8,078,527 B2 | 12/2011 | Cerise et al. |
| 8,078,528 B1 | 12/2011 | Vicente et al. |
| 8,086,523 B1 | 12/2011 | Palmer |
| 8,127,986 B1 | 3/2012 | Taylor et al. |
| 8,160,960 B1 | 4/2012 | Fei et al. |
| 8,195,549 B2 | 6/2012 | Kasower |
| 8,234,498 B2 | 7/2012 | Britti et al. |
| 8,315,943 B2 | 11/2012 | Torrez et al. |
| 8,321,334 B1 | 11/2012 | Kornegay et al. |
| 8,335,741 B2 | 12/2012 | Kornegay et al. |
| 8,355,967 B2 | 1/2013 | Debie et al. |
| 8,364,588 B2 | 1/2013 | Celka et al. |
| 8,515,844 B2 | 8/2013 | Kasower |
| 2001/0029482 A1 | 10/2001 | Tealdi et al. |
| 2001/0039523 A1 | 11/2001 | Iwamoto |
| 2001/0049672 A1 | 12/2001 | Moore et al. |
| 2002/0023051 A1 | 2/2002 | Kunzle et al. |
| 2002/0032645 A1 | 3/2002 | Nozaki et al. |
| 2002/0032647 A1 | 3/2002 | Delinsky et al. |
| 2002/0035511 A1 | 3/2002 | Haji et al. |
| 2002/0077964 A1 | 6/2002 | Brody et al. |
| 2002/0099635 A1 | 7/2002 | Guiragosian |
| 2002/0111890 A1 | 8/2002 | Sloan et al. |
| 2002/0128960 A1 | 9/2002 | Lambiotte et al. |
| 2002/0128962 A1 | 9/2002 | Kasower |
| 2002/0165757 A1 | 11/2002 | Lisser |
| 2002/0169747 A1 | 11/2002 | Chapman et al. |
| 2002/0198824 A1 | 12/2002 | Cook |
| 2003/0009418 A1 | 1/2003 | Green et al. |
| 2003/0018549 A1 | 1/2003 | Fei et al. |
| 2003/0028477 A1 | 2/2003 | Stevenson et al. |
| 2003/0033242 A1 | 2/2003 | Lynch et al. |
| 2003/0041031 A1 | 2/2003 | Hedy |
| 2003/0065563 A1 | 4/2003 | Elliott et al. |
| 2003/0149659 A1 | 8/2003 | Danaher et al. |
| 2003/0154162 A1 | 8/2003 | Danaher et al. |
| 2003/0163435 A1 | 8/2003 | Payone |
| 2003/0212654 A1 | 11/2003 | Harper et al. |
| 2003/0216965 A1 | 11/2003 | Libman |
| 2003/0233323 A1 | 12/2003 | Bilski et al. |
| 2004/0030621 A1 | 2/2004 | Cobb |
| 2004/0030629 A1 | 2/2004 | Freeman et al. |
| 2004/0030649 A1 | 2/2004 | Nelson et al. |
| 2004/0078323 A1 | 4/2004 | Johnston et al. |
| 2004/0107125 A1 | 6/2004 | Guheen et al. |

(56) References Cited

U.S. PATENT DOCUMENTS

| | | |
|---|---|---|
| 2004/0111292 A1 | 6/2004 | Hutchins |
| 2004/0111359 A1 | 6/2004 | Hudock |
| 2004/0128230 A1 | 7/2004 | Oppenheimer et al. |
| 2004/0138995 A1 | 7/2004 | Hershkowitz et al. |
| 2004/0158521 A1 | 8/2004 | Newton |
| 2004/0163101 A1 | 8/2004 | Swix |
| 2004/0186807 A1 | 9/2004 | Nathans et al. |
| 2004/0199456 A1 | 10/2004 | Flint et al. |
| 2004/0230534 A1 | 11/2004 | McGough |
| 2005/0004855 A1 | 1/2005 | Jenson et al. |
| 2005/0154664 A1 | 7/2005 | Guy et al. |
| 2005/0251820 A1 | 11/2005 | Stefanik et al. |
| 2005/0279827 A1 | 12/2005 | Mascavage et al. |
| 2006/0004731 A1 | 1/2006 | Seibel et al. |
| 2006/0041443 A1 | 2/2006 | Horvath |
| 2006/0080233 A1 | 4/2006 | Mendelovich et al. |
| 2006/0080251 A1 | 4/2006 | Fried et al. |
| 2006/0155639 A1 | 7/2006 | Lynch et al. |
| 2006/0178971 A1 | 8/2006 | Owen et al. |
| 2006/0212386 A1 | 9/2006 | Willey et al. |
| 2006/0233332 A1 | 10/2006 | Toms |
| 2006/0242039 A1 | 10/2006 | Haggerty et al. |
| 2006/0242046 A1 | 10/2006 | Haggerty et al. |
| 2006/0242050 A1 | 10/2006 | Haggerty et al. |
| 2006/0282359 A1 | 12/2006 | Nobili et al. |
| 2007/0016500 A1 | 1/2007 | Chatterji et al. |
| 2007/0016501 A1 | 1/2007 | Chatterji et al. |
| 2007/0067206 A1 | 3/2007 | Haggerty et al. |
| 2007/0078741 A1 | 4/2007 | Haggerty et al. |
| 2007/0094137 A1 | 4/2007 | Phillips et al. |
| 2007/0100719 A1 | 5/2007 | Chwast et al. |
| 2007/0192165 A1 | 8/2007 | Haggerty et al. |
| 2007/0226130 A1 | 9/2007 | Haggerty et al. |
| 2007/0233591 A1 | 10/2007 | Newton |
| 2007/0244732 A1 | 10/2007 | Chatterji et al. |
| 2007/0260539 A1 | 11/2007 | Delinsky |
| 2007/0282736 A1 | 12/2007 | Conlin et al. |
| 2007/0288271 A1 | 12/2007 | Klinkhammer |
| 2007/0288338 A1 | 12/2007 | Hoadley |
| 2007/0288360 A1 | 12/2007 | Seeklus |
| 2007/0299770 A1 | 12/2007 | Delinsky |
| 2007/0299771 A1 | 12/2007 | Brody |
| 2008/0021802 A1 | 1/2008 | Pendleton |
| 2008/0059317 A1 | 3/2008 | Chandran et al. |
| 2008/0120155 A1 | 5/2008 | Pliha |
| 2008/0120569 A1 | 5/2008 | Mann et al. |
| 2008/0133322 A1 | 6/2008 | Kalia et al. |
| 2008/0140507 A1 | 6/2008 | Hamlisch et al. |
| 2008/0222015 A1 | 9/2008 | Megdal et al. |
| 2008/0228635 A1 | 9/2008 | Megdal et al. |
| 2008/0027094 A1 | 10/2008 | Lent et al. |
| 2008/0255897 A1 | 10/2008 | Megdal et al. |
| 2008/0294540 A1 | 11/2008 | Celka et al. |
| 2008/0319895 A1 | 12/2008 | Lazerson |
| 2009/0018996 A1 | 1/2009 | Hunt et al. |
| 2009/0060343 A1 | 3/2009 | Rosca |
| 2009/0112650 A1 | 4/2009 | Iwane |
| 2009/0126013 A1 | 5/2009 | Atwood et al. |
| 2009/0271248 A1 | 10/2009 | Sherman et al. |
| 2009/0327120 A1 | 12/2009 | Eze et al. |
| 2010/0009320 A1 | 1/2010 | Wilkelis |
| 2010/0030677 A1 | 2/2010 | Melik-Aslanian et al. |
| 2010/0114724 A1 | 5/2010 | Ghosh et al. |
| 2010/0114747 A1 | 5/2010 | Kasower |
| 2010/0145840 A1 | 6/2010 | Kasower |
| 2010/0223168 A1 | 9/2010 | Haggerty et al. |
| 2010/0250497 A1 | 9/2010 | Redlich et al. |
| 2010/0299251 A1 | 11/2010 | Thomas |
| 2010/0299252 A1 | 11/2010 | Thomas |
| 2010/0299260 A1 | 11/2010 | Thomas |
| 2010/0324986 A1 | 12/2010 | Thomas |
| 2010/0325036 A1 | 12/2010 | Thomas |
| 2011/0004514 A1 | 1/2011 | Thomas |
| 2011/0004546 A1 | 1/2011 | Thomas |
| 2011/0029427 A1 | 2/2011 | Haggerty et al. |
| 2011/0040629 A1 | 2/2011 | Chiu et al. |
| 2011/0060673 A1 | 3/2011 | Delinsky et al. |
| 2011/0112950 A1 | 5/2011 | Haggerty et al. |
| 2011/0166988 A1 | 7/2011 | Coulter |
| 2011/0184838 A1 | 7/2011 | Winters et al. |
| 2011/0213641 A1 | 9/2011 | Metzger, II et al. |
| 2011/0295733 A1 | 12/2011 | Megdal et al. |
| 2012/0123931 A1 | 5/2012 | Megdal et al. |
| 2012/0124498 A1 | 5/2012 | Santoro et al. |
| 2012/0158574 A1 | 6/2012 | Brunzell et al. |
| 2012/0173339 A1 | 7/2012 | Flynt et al. |
| 2012/0239553 A1 | 9/2012 | Gonen et al. |
| 2012/0265607 A1 | 10/2012 | Belwadi |
| 2012/0265661 A1 | 10/2012 | Megdal et al. |
| 2013/0006825 A1 | 1/2013 | Robida et al. |
| 2013/0018811 A1 | 1/2013 | Britti et al. |
| 2013/0031624 A1 | 1/2013 | Britti et al. |
| 2013/0080315 A1 | 3/2013 | Torrez et al. |
| 2013/0124392 A1 | 5/2013 | Achanta et al. |
| 2013/0173450 A1 | 7/2013 | Celka et al. |
| 2013/0173451 A1 | 7/2013 | Kornegay et al. |
| 2013/0211986 A1 | 8/2013 | Debie et al. |

FOREIGN PATENT DOCUMENTS

| | | |
|---|---|---|
| EP | 1 122 664 | 8/2001 |
| JP | 2003-016261 | 1/2003 |
| KR | 10-2004-0078798 | 9/2004 |
| WO | WO 99/004350 | 1/1999 |
| WO | WO 99/046710 | 9/1999 |
| WO | WO 00/011574 | 3/2000 |
| WO | WO 01/057720 | 8/2001 |
| WO | WO 01/075754 | 10/2001 |
| WO | WO 01/084281 | 11/2001 |
| WO | WO 03/101123 | 12/2003 |
| WO | WO 2004/114160 | 12/2004 |
| WO | WO 2005/022348 | 3/2005 |
| WO | WO 2006/099492 | 9/2006 |
| WO | WO 2007/149941 | 12/2007 |
| WO | WO 2008/147918 | 12/2008 |
| WO | WO 2013/009920 | 1/2013 |

OTHER PUBLICATIONS

U.S. Appl. No. 12/705,511, filed Feb. 12, 2010, Bargoli et al.
Avery et al., "Consumer Credit Scoring: Do Situational Circumstances Matter?" Journal of Banking & Finance, vol. 28, 2004, pp. 835-856.
CreditAnalyst, Digital Matrix Systems, as printed out Mar. 4, 2008, pp. 2.
CreditToolkit, Digital Matrix Systems, as printed out Mar. 4, 2008, pp. 2.
CreditXpert, http://www.creditxpert.com/Products/individuals.asp printed Oct. 12, 2012 in 1 page.
"Consumers Gain Immediate and Full Access to Credit Score Used by Majority of U.S. Lenders." PR Newswire, ProQuest Copy; Mar. 19, 2001; p. 1.
CreditXpert Inc., CreditXpert 3-Bureau Comparison™, [online] [retrieved on Jun. 7, 2005] Retrieved from the internet http://www.creditxpert.com/CreditXpert%203-Bureau%20Comparison(TM)%20sample.pdf, 2002.
CreditXpert Inc., CreditXpert Credit Score & Analysis, [online] [retrieved on Jun. 7, 2005] Retrieved from the internet http://www.creditxpert.com/CreditXpert%20Score%20&%20Analysis%20and%20Credit%20Wizard%20sample.pdf, 2002.
CreditXpert Inc., CreditXpert Essentials™, Advisor View-Experian Jul. 7, 2003, [online] [retrieved on Nov. 29, 2004] Retrieved from the internet http://www.creditxpert.com/cx_ess_app.pdf, 2004., Issue Wallace.
CreditXpert Inc., CreditXpert Essentials™, Advisor View-TransUnion, [online] [retrieved on Jun. 7, 2005] Retrieved from the internet http://www.creditxpert.com/cx_ess_app.pdf, 2004., Issue Wallace.
CreditXpert Inc., CreditXpert Essentials™, Applicant View, [online] [retrieved on Jun. 7, 2005] Retrieved from the internet http://www.creditxpert.com/cx_ess_app.pdf, 2004.

(56) References Cited

OTHER PUBLICATIONS

CreditXpert Inc., CreditXpert What-If Simulator™, [online] [retrieved on Jun. 7, 2005] Retrieved from the internet http://www.creditxpert.com/CreditXpert%20What-If%20Simulator(TM)%20sample.pdf, 2002.
Demby, Elayne, "Special Report: Letting Consumers Know the Score—and More", Collections and Credit Risk, New York, Feb. 2003, vol. 8, Issue 2, p. 53, pp. 3.
EFunds Introduces QualiFileSM, Deluxe Corporation, Sep. 1999, Milwaukee, WI.
Ettorre, Paul Kahn on Exceptional Marketing, Management Review, vol. 38(11), Nov. 1994, pp. 48-51.
"Equifax and FICO Serve Consumers", Mar. 2001.
Expensr.com http://www.expensr.com/, as retrieved on Sep. 17, 2008.
Experian, Custom Strategist and Qualifile from Funds, 2000, in 2 pages.
Fair Isaac Corporation, myFICO: Calculators: Credit Assessment, [online] [retrieved on Jun. 8, 2005] Retrieved from the internet http://www.myfico.com/CreditEducation/Calculators/CreditAssessment.aspx, 2005.
Fair Isaac Corporation, myFICO: Help: FICO Score Simulator, [online] [retrieved on Jun. 8, 2005] Retrieved from the internet http://www.myfico.com/Help/Simulator.aspx?fire=5, 2005.
Fair Isaac Corporation, myFICO: Products: Suze Orman's FICO Kit Platinum, [online] [retrieved on Jun. 8, 2005] Retrieved from the internet http://www.myfico.com/Products/FICOKit/Description.aspx, 2005.
Fair Isaac Corporation, myFICO: Products: Suze Orman's FICO® Kit Platinum: FICO Score Check, [online] [retrieved on Jun. 7, 2005] Retrieved from the internet http://www.myfico.com/Products/FICOKit/Sample03.html, 2005.
Fair Isaac Corporation, myFICO: Sample: FICO Score Simulator: "Max Out" Your Credit Cards, [online] [retrieved on Jun. 8, 2005] Retrieved from the internet http://www.myfico.com/Content/Samples/Sample_ScoreSimulatorResults.asp?Simulation=4&ReportID.
Fair Isaac Corporation, myFICO: Sample: FICO Score Simulator: Miss Payments, [online] [retrieved on Jun. 8, 2005] Retrieved from the internet http://www.myfico.com/Content/Samples/Sample_ScoreSimulatorResults.asp?miss_payment=radiobutton&Simulation=.
Fair Isaac Corporation, myFICO: Sample: FICO Score Simulator: Pay Down Delinquent Balances First, [online] [retrieved on Jun. 8, 2005] Retrieved from the internet http://www.myfico.com/Content/Samples/Sample_ScoreSimulatorResults.asp?textfieldCC=750.
Fair Isaac Corporation, myFICO: Sample: FICO Score Simulator: Suggested Best Action, [online] [retrieved on Jun. 8, 2005] Retrieved from the internet http://www.myfico.com/Content/Samples/Sample_ScoreSimulatorResults.asp?Simulation=111&ReportID=1&Pr.
Fisher, Joseph, "Access to Fair Credit Reports: Current Practices and Propsed Legislation," American Business Law Journal, Fall 1981, vol. 19, No. 3, p. 319.
Ideon, Credit-Card Registry that Bellyflopped this Year, Is Drawing some Bottom-Fishers, The Wall Street Journal, Aug. 21, 1995, pp. C2.

"Judging Credit: Consumers Need Better Finance Tools", News Journal, Daytona Beach, FL, Dec. 28, 2002.
Lee, W.A., "Experian Eyes Payments, Mulls Deals" American Banker: The Financial Services Daily, 2pgs., New York, NY, May 30, 2003.
Lee, W.A.; "Fair Isaac Taps Institutions for Credit Score Distribution", American Banker: The Financial Services Daily, New York, NY, Apr. 9, 2002, vol. 167, Issue 67, 1 Page.
Lee, W.A., "Money, Quicken, and the Value of Alliances", American Banker: The Financial Services Daily, 2pgs., New York, NY, Jul. 28, 2003.
Miller, Margaret, "Credit Reporting Systems Around the Globe: The State of the Art in Public and Private Credit Registries", Jun. 2000, pp. 32, http://siteresources.worldbank.org/INTRES/Resources/469232-1107449512766/Credit_Reporting_Systems_Around_The_Globe.pdf.
Occasional CF Newsletter; http://www.halhelms.com/index.cfm?fuseaction=newsletters.oct1999; Oct. 1999.
Pagano, et al., "Information Sharing in Credit Markets," Dec. 1993, The Journal of Finance, vol. 48, No. 5, pp. 1693-1718.
Partnoy, Frank, Rethinking Regulation of Credit Rating Agencies: An Institutional Investor Perspective, Council of Institutional Investors, Apr. 2009, pp. 21.
Powerforms: Declarative Client-Side for Field Validation, ISSN 1386-145x, Dec. 2000.
Singletary, Michelle "Ratings for the Credit Raters", The Washington Post, The Color of Money column, Mar. 24, 2002 in 1 page.
Singletary, Michelle, "Score One for Open Credit Ratings", The Washington Post, Washington DC, Jun. 18, 2000, 3 pages.
Stanton, T.H., "Credit Scoring and Loan Scoring as Tools for Improved Management of Federal Credit Programs", Financier, Philadelphia, Summer 1999, vol. 6, 36 pages.
Stein, Benchmarking Default Prediction Models: Pitfalls and Remedies in Model Validation, Moody's KMV, Revised Jun. 13, 2002, Technical Report #020305; New York.
Watts, Craig, "Consumers Now Can Know What Loan Rate Offers to Expect Based on Their FICO Credit Score at MyFICO.com," Mar. 6, 2002, http://www.myfico.com/PressRoom/PressReleases/2002_03_06.aspx.
Watts, Craig, "Fair, Isaac and Equifax Give Consumers New Score Power Tools Offering Greater Insights for Managing Their Credit Health," May 21, 2002, http://www.myfico.com/PressRoom/PressReleases/2002_05_21.aspx.
Webpage printed from http://www.magnum.net/pdfs/RapUpBrochure.pdf as printed Mar. 3, 2008.
West, David, "Neural Network Credit Scoring Models", Computers & Operations Research, vol. 27, 2000, pp. 1131-1152.
Yücesan et al., "Distributed web-based simulation experiments for optimization", Simulation Practice and Theory 9 (2001), pp. 73-90.
Zimmerman et al., "A web-based platform for experimental investigation of electric power auctions", Decision Support Systems 24 (1999), pp. 193-205.
Zoot—Instant Rules GUI, www.zootweb.com/instant_rules_GUI.html as printed Mar. 3, 2008.
Zoot—Rules Management GUI, www.zootweb.com/business_rules_GUI.html as printed Mar. 3, 2008.
International Search Report and Written Opinion for Application No. PCT/US2012/046316, dated Sep. 28, 2012.

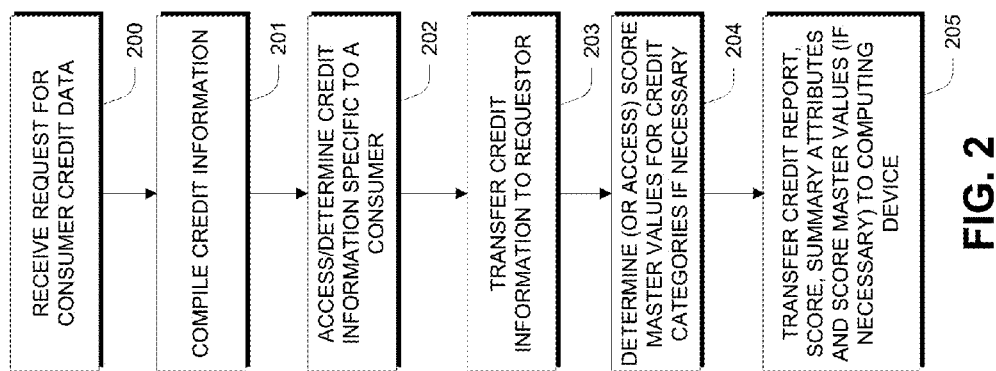

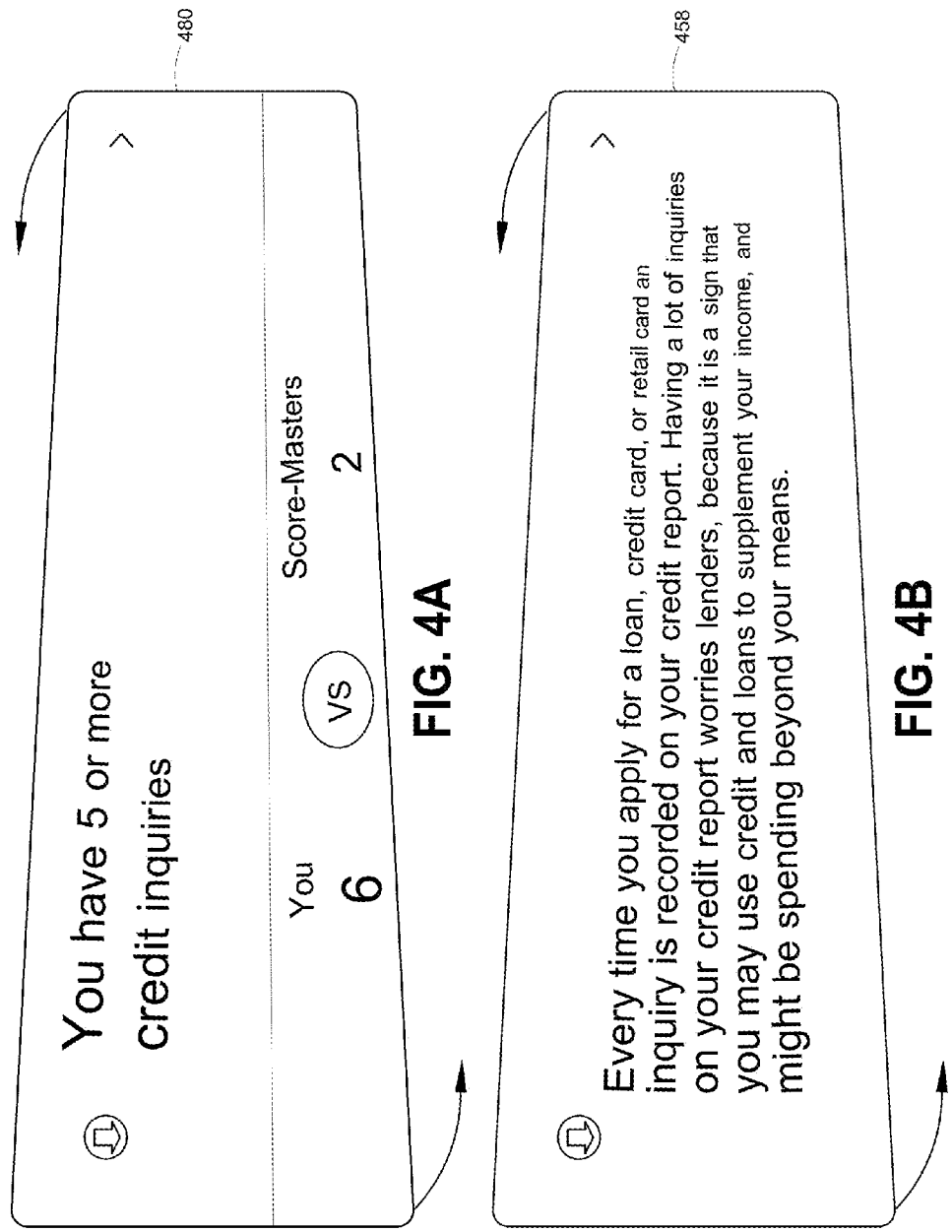

Accounts 12

90 percent of the credit score calculation is based on how you manage your different accounts. Accounts include credit cards, retail credit cards, real estate loans, installment loans, and collection accounts.

Experian Report Updated 10.11.2012

[Sort]

Chase Manhattan — 800
Account Status: XXXX-XXXX-XXXX-3792  Open  — 803

| | |
|---|---|
| Account Name | Credit Card 1 |
| Account # | 3792 |
| Payment Status | Complete |
| Account Type | Credit Cards |
| Balance | 7,6553 |

Wells Fargo
Account Status: XXXX-XXXX-5690  Open

| | |
|---|---|
| Account Name | Mortgage |
| Account # | 5690 |
| Payment Status | Complete |
| Account Type | Real Estate Loans |
| Balance | 326,411 |

Charles Schwab — 801
Account Status: XXXX-XXXX-XXXX-5653  Open

| | |
|---|---|
| Account Name | Credit Card 2 |
| Account # | 5653 |
| Payment Status | Complete |
| Account Type | Credit Cards |
| Balance | 6,456 |

Macy's Card
Account Status: XXXX-7876  Open  — 802

| | |
|---|---|
| Account Name | Charge Card 1 |
| Account # | 7876 |
| Payment Status | Complete |
| Account Type | Retail |
| Balance | 75 |

FIG. 8

PRESENTATION OF CREDIT SCORE FACTORS

CROSS-REFERENCE TO RELATED APPLICATIONS

This application claims priority from provisional U.S. Pat. App. No. 61/732,244, filed on Nov. 30, 2012, which is hereby incorporated by reference in its entirety.

This application is related to, but does not claim priority from, U.S. patent application Ser. No. 10/452,155, filed May 30, 2003, now U.S. Pat. No. 7,610,229; U.S. patent application Ser. No. 12/606,060, filed Oct. 26, 2009, now U.S. Pat. No. 8,015,107; U.S. patent application Ser. No. 11/150,480, filed Jun. 10, 2005, now U.S. Pat. No. 7,593,891; U.S. patent application Ser. No. 12/563,779, filed Sep. 21, 2009, now U.S. Pat. No. 7,925,582; U.S. patent application Ser. No. 13/326,803, filed Dec. 15, 2011, and U.S. Prov. Pat. App. No. 60/384,650, filed May 30, 2002. The disclosures of the above-listed applications are all hereby incorporated by reference as if set forth herein in their entireties.

BACKGROUND

This disclosure relates to the field of consumer credit information and particularly to the presentation of credit score and credit report information.

The credit report and credit score are an important indicator of a consumer's financial health. Consequently, monitoring their credit reports and having a high credit score is important to consumers for many reasons. A high credit score may qualify a consumer for various financial programs and/or allow a consumer to receive favorable rates is such programs, such as loan applications, rental applications, real estate mortgages, and so on. The credit report may allow a user to view the underlying data affecting their credit score. Thus, many consumers have a substantial interest in finding ways to improve their credit scores and understand their credit reports.

There is much information available to consumers as to how to improve credit scores. For example, sources provide advice to consumers to pay off loans, to establish certain numbers of credit accounts, to establish new loans, to raise or lower credit card limits, and so on. However, this advice is generic to all consumers and does not provide information specific to a particular consumer's situation. The question for many consumers then is "How is my particular credit data is affecting my credit score?".

To determine effective actions to take, it is often necessary to analyze a consumer's underlying credit information. However, paper credit reports are often confusing to consumers, and do not explain the effects of particular pieces of data contained within the credit report. Furthermore, consumers often do not know how their credit activities affect their credit score or how their credit score is calculated. This translates into consumers struggling to use and analyze their credit information in meaningful ways, or develop effective strategies to raise their credit score.

SUMMARY

Thus, it would be advantageous for consumers to be able to quickly view and understand how credit information affects their credit score. In particular, it would be advantageous for consumers to be able to visualize their particular credit information in various categories that may either improve or detract from their credit score. It would also be advantageous for consumers to understand how information in these categories is affecting their credit score.

Consumers are interacting more every day with mobile devices, such as smart phones, tablets, and the like. However, information that consumers traditionally view in the form of printed materials don't optimize interaction capabilities of such mobile devices. Discussed herein are systems and methods for generating user interfaces that display credit information of consumers in manners that are specifically tailored for optimal use on mobile devices, such as user interfaces that optimize the user's ability to interface with credit data and to explore such credit data. In particular, the user interfaces described herein are dynamically created using credit data specific to a particular consumer.

In an embodiment, a mobile application can display and receive input from various user interfaces, including a flippable user interface that displays consumer specific credit information values in a variety of credit categories. The flippable user interface allows a user to touch a flippable user interface and cause it to display, on a reverse side, information corresponding to the credit category that explains how that credit category affects their credit score.

One embodiment may comprise non-transitory computer storage that comprises executable instructions configured to cause one or more computer processors to perform a number of operations. These operations may include receiving first consumer credit information associated with a consumer. The first consumer credit information may comprise summary data associated with categories of credit information that impact a credit score of the consumer. Another operation may include generating, for display on a touch sensitive computing device, a user interface comprising a plurality of panes associated with respective categories of credit information, wherein each pane is configured to alternatively depict two visual indicators. The first visual indicators may include an indication of whether credit information of the consumer in a respective category positively or negatively impacts the credit score of the consumer, a brief description of certain first consumer credit information associated with the respective category, and a first value based on a consumer's credit information in the respective category. The second visual indicators may include detailed informational text indicating rationale for adjustments to credit scores in response to credit information associated with the respective category. The user interface may be associated with software code that is configured to cause the touch sensitive computing device to, in response to receiving a touch input of a particular pane, display a visual animation depicting rotation of the pane upon a horizontal or vertical axis in order to alternate display of visual indicators depicted in the particular pane between the first visual indicators and the second visual indicators displayed in the particular pane. The visuals indicators displayed in the particular pane may be alternated in response to each touch input on the particular pane.

Another embodiment may comprise a computerized method, performed by a computer system, comprising receiving credit summary information regarding a specific consumer, based on a credit report and credit score generated by a credit bureau, storing the credit summary information in a computer memory, and generating a plurality of flippable user interface panes, each flippable user interface pane being associated with a credit factor affecting the credit score. The method may further comprise accessing, for each flippable user interface pane, respective portions of the consumer's credit summary information in computer memory, the respective portions being related to the credit factor of the respective interface pane. The method may further comprise receiving a touch input from a user via a touch screen on a first flippable user interface pane of the plurality of flippable user interface panes. The method may, in response to the touch input, if a description of the credit factor of the first flippable user interface pane is displayed in the first flappable user interface pane, display an animation depicting a rotation of the first user interface pane, wherein the animation results in display of detailed informational text indicating rationale for adjustments to credit scores in response to the credit factor in the first flippable user interface pane, or, if detailed informational text is displayed indicating rationale for adjustments to credit scores in response to the credit factor associated with the first flippable user interface pane, display a second animation depicting a rotation of the first user interface pane, wherein the second animation results in display of the description of the credit factor of the first flippable user interface pane in the first flippable user interface pane.

In another embodiment, a mobile computing device may comprise a data store configured to store explanatory text and a consumer's summary credit information, the consumer's summary credit information comprising credit data values, the credit data values each associated with a score factor, each score factor associated with explanatory text that describes how a score factor impacts a credit score. It may also further comprise a touch screen display configured to receive touch screen input, one or more processors; and a user interface module executable on the one or more processors. The user interface module may be configured to receive credit information specific to a consumer comprising summary credit information, store the summary credit information in the data store, and display a plurality of score factor user interface panes associated with one of a plurality of score factors, each pane comprising at least a description of the associated score factor, an indicator of whether the score factor positively or negatively impacts the consumer's credit score, and a score factor value specific to the consumer. The user interface module may further configured to receive a touch screen input over an area corresponding to a first score factor user interface pane, reverse the first score factor user interface pane, wherein reversing the first score factor user interface pane comprises displaying an animation that rotates the first user interface pane on an axis, access the data store for first explanatory information associated with the score factor associated with the first score factor user interface pane, and display the first explanatory information within the reverse side of the first score factor user interface pane.

These and other features and advantages of embodiments will become apparent from the following description of embodiments. Neither this summary nor the following detailed description purports to define the invention.

BRIEF DESCRIPTION OF THE DRAWINGS

FIG. 2 is a flowchart illustrating processes taken to deliver credit information to a user's mobile computing device, as used in an embodiment.

FIG. 4A, a close up view of a portion of FIG. 4, illustrates a flippable user interface, as used in an embodiment.

FIG. 4B, a close up view of a portion of FIG. 4, illustrates a flippable user interface, as used in an embodiment.

FIG. 8 is a sample credit report user interface for analyzing credit report accounts, as used in an embodiment.

DETAILED DESCRIPTION

Overview

Figure 4:
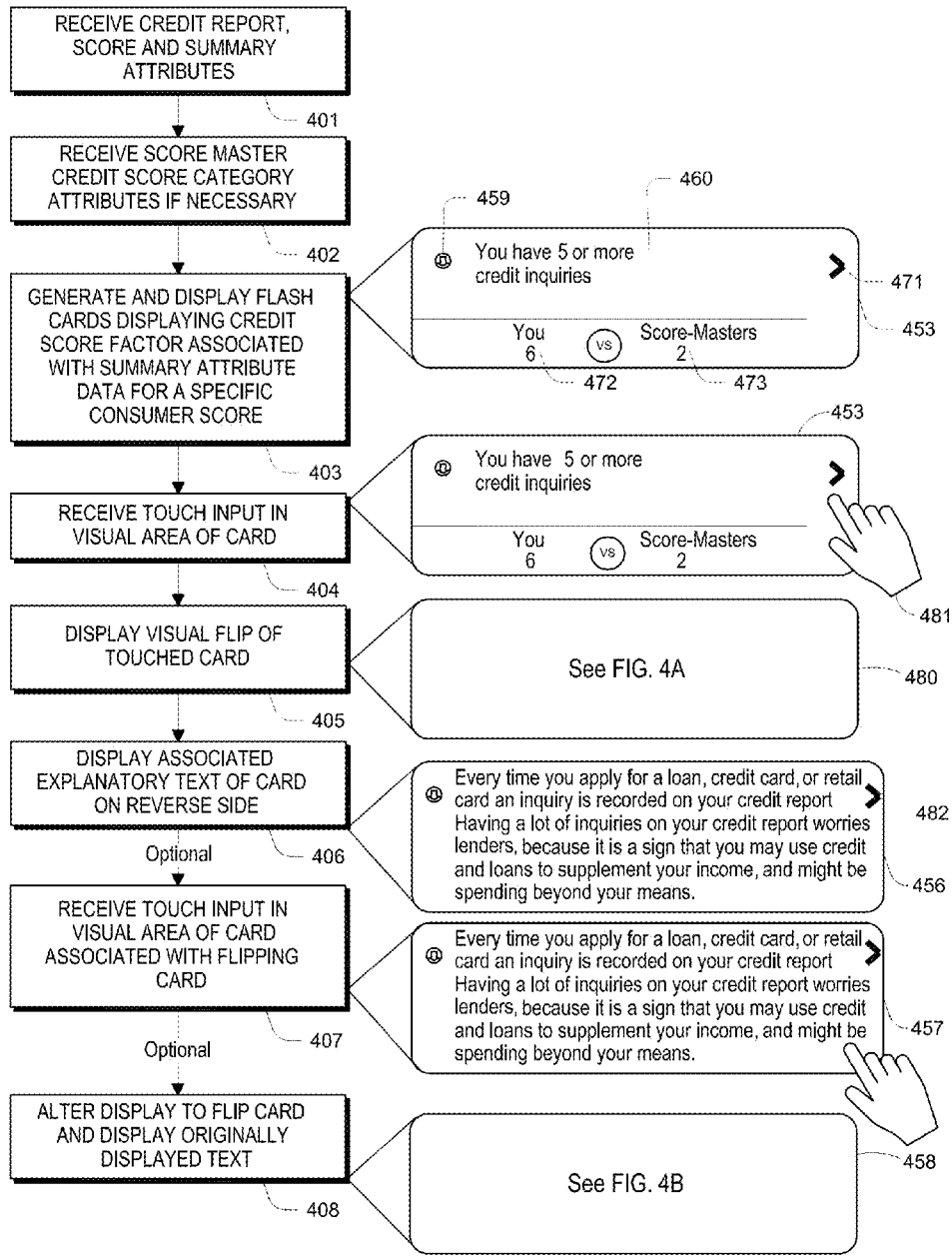
FIG. 4 is a flowchart with accompanying illustrations, the flowchart illustrating processes taken to use a flippable user interface, as used in an embodiment.
Figure 5:
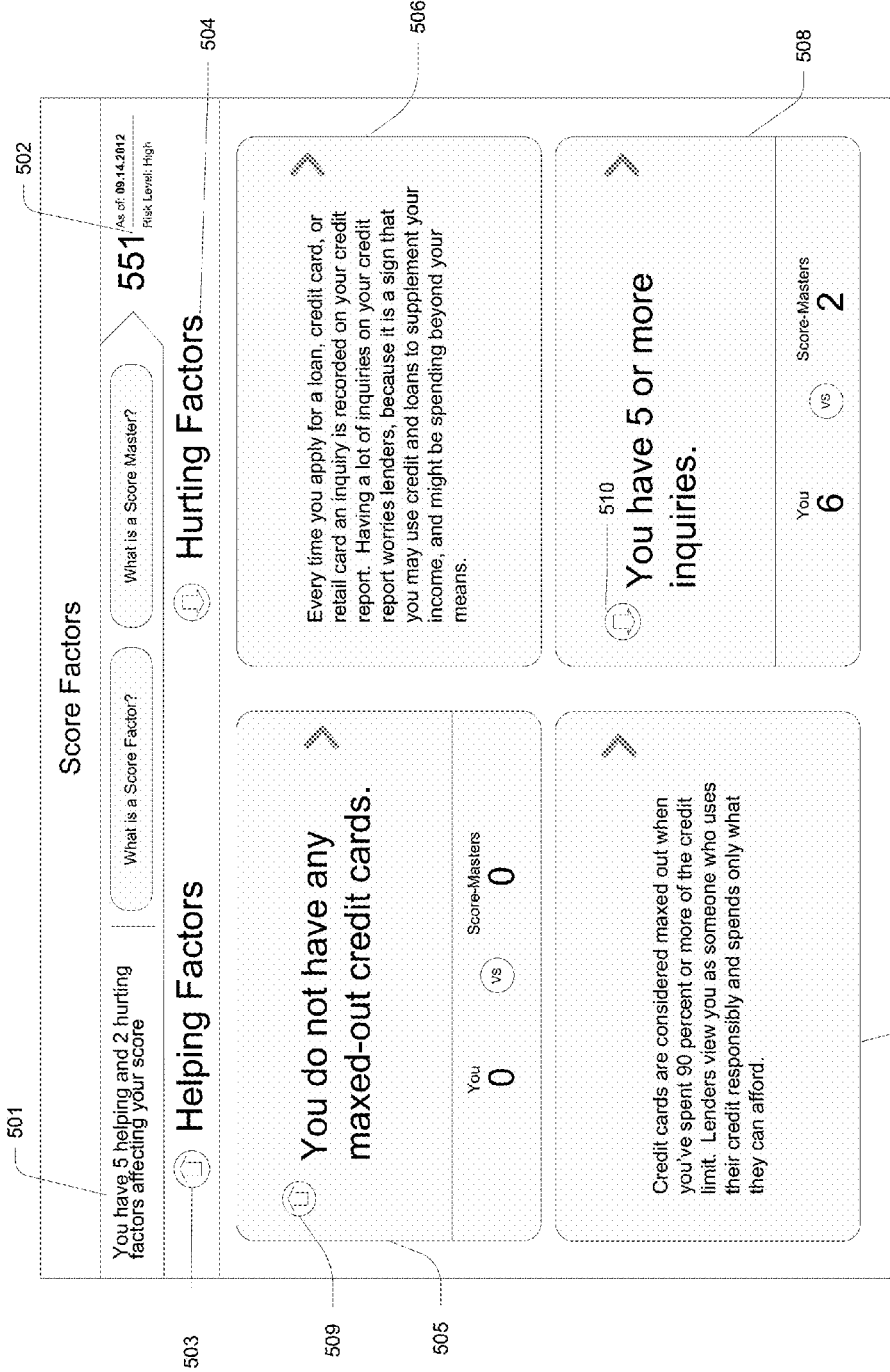
FIG. 5 is a sample flippable user interface for analyzing credit report data, as used in an embodiment.

A computing device 162 such as a mobile smart phone may display a score factors user interface 400 (FIG. 4) comprising one or more credit score factor user interface panes that provide context for a consumer's credit report, as illustrated in FIG. 5. The score factor user interface panes may comprise a description of the type of data associated with a summary of a particular consumer's credit score inputs that is to be displayed and/or compared. The analysis of this summary of credit score inputs (e.g. sometimes known as a summary attribute) may be considered a score factor. Score factors may including conditions, rules, or criteria that are applied to various types of summary data of a particular consumer in order to determine an influence that the particular summary data may have on the particular consumer's credit score, either positively or negatively. For example, the user interface pane 508 (in FIG. 5) has the description of a score factor called "You have 5 or more credit inquiries" which is based on a summary attribute that counts the number of credit inquiries for a consumer, and optionally the average score master. If the summary data indicates that there are 5 of more credit inquiries for a particular consumer, then the condition for that score factor is met, and the mobile device may display the score factor description.

In some embodiments, a score factor user interface pane may also have an indicator associated with whether the particular score factor affects the score positively or negatively. For example, score factor user interface pane 508 contains an arrow pointing at the bottom of the screen (or may have a red color) to indicate that a higher number affects the consumer's credit score negatively. Whereas score user interface pane 505 contains an arrow pointing at the top of the screen (or may have a green color) to indicate that a higher number affects the score positively. The categories for the score factors, and whether a higher number is more positive or negative (i.e. a positive score factor or a negative score factor) may be transmitted from a credit bureau 108 or back end system such as credit report system 100 to the computing device 162.

Also displayed within a score factor user interface pane are the values of the consumer's related score factor data and optionally, the average data points in the same score factor for a score master. For example, score factor user interface pane 508 for the score factor "You have 5 or more inquiries" displays the value 6 for the consumer, and 2 for the score master side by side, so that the user can easily know their own value for that category, and optionally compare that value between the consumer values and score master scores (that can be used as positive guidelines to improve the consumer's score).

A score factor user interface pane may be selected via the touch screen interface to reveal more information about the credit score factor. When touched, in some embodiments, the computing device 162 may display the "virtual" reverse side of the score factor user interface pane (506 and 507). The virtual reverse side may comprise explanatory text about how a consumer's score in that particular score factor may affect his overall credit score. Virtual reverse sides may optionally be color coded depending on whether a score factor is positive or negative. If touched again, the user interface pane may return to the original side to show the score factor description and consumer values (and optionally score master values).

When transitioning to or from the reverse side of the score factor user interface pane, the user interface element may appear to flip or rotate either horizontally or vertically on its center vertical or horizontal axis respectively to the reverse side. In some embodiments, such a rotation or flip may occur more than once. In some embodiments, a rotation or flip may occur several times in succession, where the rotation speed slows down over time until the card comes to rest on the reverse side.

The score factor panes displayed on the user device may be selected by the user, the computing device 162, credit bureau 108, or other backend system such as credit report system 100 based on which score factors apply to a particular user's credit information. For example, the user interface pane 508 has the description "You have 5 or more inquiries". This particular score factor may not be selected for display if the number of credit inquiries for the consumer was less than 5. Additionally, the order that the user interface panes are displayed may indicate the relative impact or importance of each score factor in determining a consumer's credit score.

In some embodiments, when a score factor user interface pane is touched, the score factor instead displays to a user the specific credit information inputs that made up the score factor statistic. For example, if the user touches the user interface 505, the user device may display information about the associated credit card accounts, such as accounts displayed in FIG. 8.

High Level Data Flow

Figure 1:
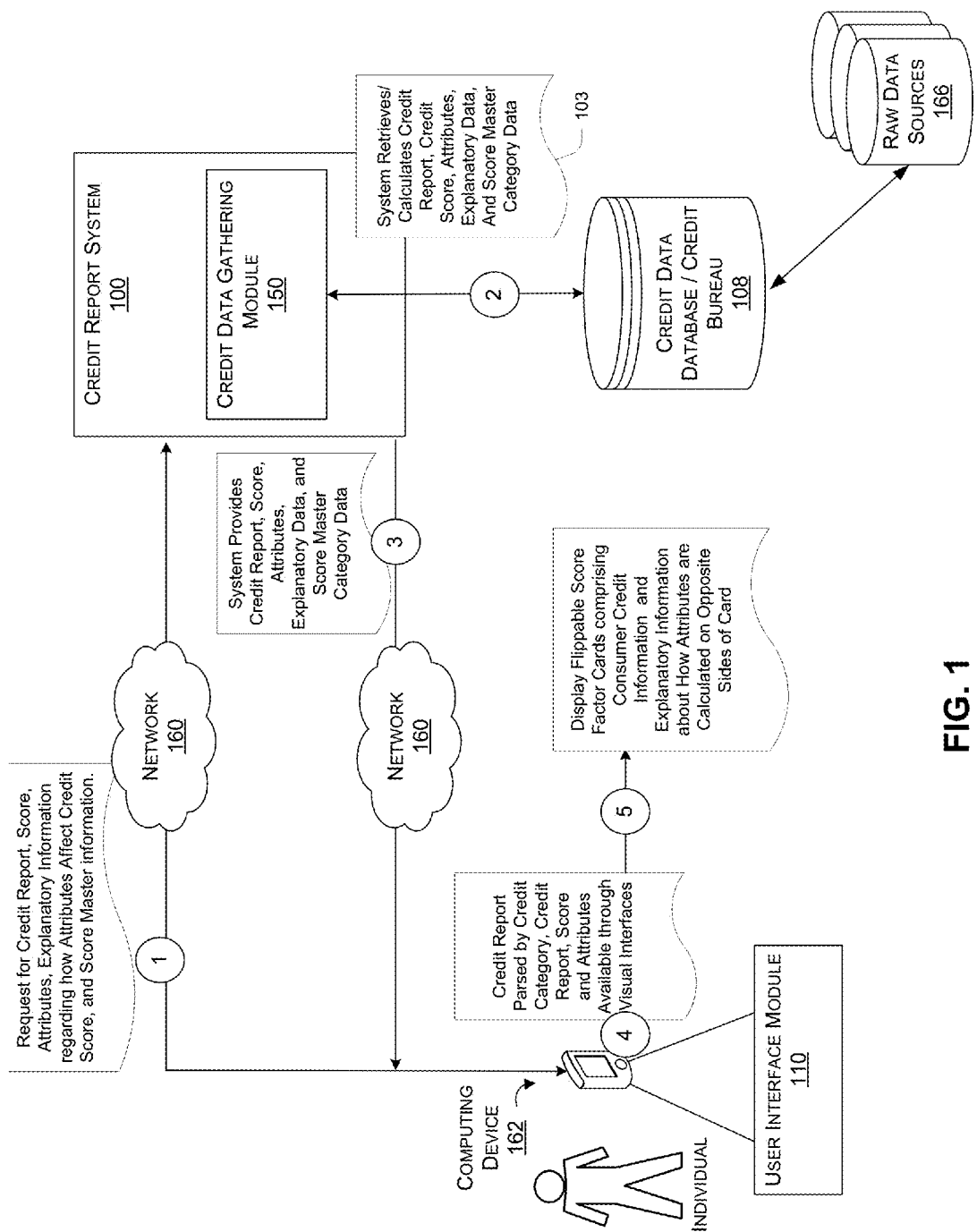
FIG. 1 is a flow diagram showing information exchange between a mobile computing device of a user and a credit report system that generates a credit score category visualization of the user for display on the user's mobile computing device, as used in an embodiment.

FIG. 1 is a block and flow diagram of an embodiment of a credit score factor computing system, in conjunction with related components. The entire credit score factor computing system may be a single computing device or a plurality of computing devices connected by a network or distributed computing system.

In an embodiment, various software modules are included in the credit score factor computing system, which may be stored on the system itself, or on computer readable storage media separate from the system and in communication with the system via a network or other appropriate means. The credit score factor computing system may include a credit data gathering module 150, which performs various tasks of gathering data used by the credit score factor computing system. Such data may include, for example, credit data 103 retrieved from credit data database 108. Such a database 108 may comprise one or more credit bureaus and their databases, which usually receive information from raw data sources 166, such as banks and creditors.

The credit data may be retrieved via a network 160, via a dedicated communication channel, or by other means. In an embodiment, credit bureau 108 transmits credit data to the credit report system 100 via a secured communication channel to ensure the privacy and security of the credit data.

In an embodiment, credit data is gathered on demand as required by the credit score factor computing system. In another embodiment, credit data is gathered on a periodic basis independent of requests for information to the credit report system 100. In another embodiment, credit data is stored on the credit score factor computing system (for example, in client computing device 162 or credit data gathering module 150), in which case, retrieval of credit data from a credit bureau may not be necessary. The credit data may include a complete credit report about a consumer, summary data such as credit attributes (also referred to as credit variables) that are calculated using various modules, such as Experian's STAGG (standard aggregation variables), and/or credit data inputs to calculate a complete or partial credit score. Each credit data input may be associated with a particular score factor. A score factor is a value that is known to impact credit score. Examples of score factors a described elsewhere herein. In some embodiments, credit data gathering module 150 may calculate summary attributes (e.g. STAGG attributes) or perform other modifications on the credit report or other credit data gathered, to determine a score factor. In some embodiments, a score factor value may be a summary or STAGG attribute value.

Data gathering module 150 may also gather explanatory text information about how a credit score is calculated. This may include description text, algorithms, formulas, executable code, statistical variables, and the like. This information may be used to understand the significance of a score factor in calculating a credit score. This may include an indication of whether a higher or lower value of a particular score factor positively or negatively impacts a credit score. In an embodiment, the explanatory text and positive or negative indications may be retrieved from credit data database 108 on an on-demand basis as needed by the credit score factor computing system. In another embodiment, the models and/or algorithms are retrieved on a periodic basis. In another embodiment, the credit score factor computing system internally stores the models and/or algorithms (for example, stored on the client computing device 162).

In an embodiment, the credit score factor computing system further includes user interface module 110, which may include executable instructions for constructing user interfaces or otherwise interacting with end users 107. User interface module 110 may include portions that are executed by the credit report system 100 and/or by the computing device 162. Thus, discussion herein of operations performed by the user interface module 110 may be performed entirely by the credit report system 100, entirely by the computing device 162, or some portions may be performed by the credit report system 100 while other portions are performed by the computing device 162. Furthermore, other computing systems may also perform all or some of the processes discussed with reference to the user interface module 110.

In one embodiment, the user interface module 110 may access data from credit data gathering module 150 or credit data database/credit bureau 108, and use that data to construct user interfaces that assist the user in understanding his or her credit score and how the underlying data is used to construct a credit score. Such information may be presented to the end user and is designed to be easily manipulated and/or understood by the user. In an embodiment, the user interfaces transmitted by user interface module 110 are interactive. Various embodiments of the user interfaces that may be provided by user interface module 110, including score factor user interface panes that are shown and described throughout this specification. Variations on such interfaces and other possible interfaces will be known to those of skill in the art.

User interface module 110 may be configured to construct user interfaces of various types. In an embodiment, user interface module 110 constructs web pages to be displayed in a web browser or computer/mobile application. The web pages may, in an embodiment, be specific to a type of device, such as a mobile device or a desktop web browser, to maximize usability for the particular device. In an embodiment, user interface module 110 may also interact with a client-side application, such as a mobile phone application (an "app") or a standalone desktop application, and provide data to the application as necessary to display underlying credit score information.

Client computing device 162, which may comprise software and/or hardware that implements the user interface module 110, may be an end user computing device that comprises one or more processors able to execute programmatic instructions. Examples of such a computing device 162 are a desktop computer workstation, a smart phone such as the apple iPhone, a computer laptop, a tablet PC such as the iPad, a video game console, or any other device of a similar nature. In some embodiments, the client computing device 162 may comprise a touch screen that allows a user to communicate input to the device using their finger(s) or a stylus on a display screen. The computing device 162 (or any of the computing systems described herein, such as computer report system 100), as described in detail under FIG. 9, may comprise storage systems such as a hard drive or memory, or comprise any other non-transitory data storage medium. The storage systems may be configured to store executable instructions that may be executed by one or more processors to perform computerized operations on the client computing device, accept data input from a user (e.g. on the touch screen), and/or provide output to a user using the display. These executable instructions may be transmitted to another device for execution or processing by the device to implement the systems and methods described herein.

The computing device 162 may be connected to the credit report system 100, including credit data gathering module 150 or credit data database/credit bureau 108 via a network 160. The client device may be connected to the network 160, which may include any combination of networks, such as local area, wide area, Internet, etc., by way of example, either through a wired network, such as an ethernet LAN or cable modem, or via a wireless method, such as through an 802.11 access point or via a cell phone network. The network 160, allow computings devices to send (i.e. transmit) and receive electronic transmissions.

The computing device 162 may also comprise one or more client program applications, such as a mobile "app" (e.g. iPhone or Android app) that may be used by a consumer to understand their credit score, and initiate the sending and receiving of messages in the credit score factor computing system. This app may be distributed (e.g. downloaded) over the network to the client computing device directly from a credit bureau 108, from the credit report system 100, credit data gathering module 150, or from various third parties such as an apple iTunes repository. In some embodiments, the application may comprise a set of visual interfaces that may comprise templates to display a consumer's credit data information from a credit report or associated attributes in score factor categories. In some embodiments, as described above, user interfaces may be downloaded from another server or service, such as the credit report system 100. This may comprise downloading web page or other HTTP/HTTPS data from a web server and rendering it through the "app". In some embodiments, no special "app" need be downloaded and the entire interface may be transmitted from a remote Internet server to computing device 162, such as transmission from a web server that is a part of the credit report system 100 to an iPad, and rendered within the iPad's browser.

FIG. 1 also illustrates an exemplary process for accessing credit data of a particular user, rendering the credit data within user interfaces so that consumers may better understand the impact of their credit data, and displaying flippable score factor cards associated with their credit data. Depending on the embodiment, the process illustrated by interactions 1-5 of FIG. 1 may include fewer or additional interactions and/or the interactions may be performed in an order different than is illustrated.

Beginning with interaction (1), the computing device 162 may transmit to credit report system 100 a request for credit data, such as a score factors user interface including one or more score factor user interface panes, that may be generated based on underlying credit data. Such underlying credit data may include a score factor, credit report, credit score, credit attributes, and/or explanatory information regarding how attributes are calculated based underlying credit data and/or how attributes impact the credit score. In some embodiments, attributes that summarize credit data (e.g. summary attributes or summary credit information) fitting a particular category may be considered a score factor. The request may also include a request for an indication of whether a particular score factor (e.g. credit attribute) positively or negatively affects credit score.

The request may also comprise a request for score master information. Score master information may comprise average summary data, such as attributes matching a score factor, that are calculated by averaging data in that category from a group of score masters. A score master may be considered a consumer that has a credit score above a certain threshold. Score master data may be associated with a certain geographic area, and may summarize average credit data for score masters within the geographic area.

In some embodiments, such a request may be accompanied with an authentication or authorization request. For example, in some embodiments, access to credit data may be restricted based on user identification. An authentication scheme may comprise submitting a user name and password to the credit report system 100, or any other authentication mechanism known by those skilled in the art. The authentication request may have occurred prior to the request for data access, or during the request. In some embodiments, although a user may authenticate, only certain users will be authorized to receive credit report data. For example, the credit report system 100 may comprise memory storing a list of users or types of users that may gain access to their credit data, such as paying users. In some embodiments, no authentication is necessary and credit data may be freely accessed by all users. Such a request may also include a request for the algorithms or user interfaces that may be used by an "app" or browser to render and interact with the requested credit data.

In some embodiments, some functionality may be accessible by unauthenticated users, and other functionality only accessible to authenticated users. The authenticated and unauthenticated sections may have the same features, similar features, or different features. In an embodiment, the authenticated section offers additional features not available in the unauthenticated section. For example, credit data or credit-related information is used in the various systems and methods described herein. This information may be stored in member accounts or automatically retrieved based on member account data. In such an embodiment, the credit-related information may be automatically pre-populated, so that members need not enter that information, while unauthenticated users would enter their information manually.

In interaction (2) of FIG. 1, the credit report system 100 may retrieve the requested information and/or calculate the requested information. In some embodiments, the credit data gathering module 150, upon receiving a request from the computing device 162, may retrieve or calculate a credit report, credit score, attributes, explanatory data, and/or score master data from its local storage and fulfill the access request without consulting a credit bureau.

For example, the data gathering module may have previously received a credit report and credit score from a credit bureau for that user and would have the report cached in its local storage. In some embodiments, the credit report and score may be periodically retrieved for users from a credit bureau in order to have it locally on file. Alternatively, or in combination, the data gathering module 150 may retrieve in real time the credit report, credit score and/or summary credit attributes from the credit bureau/database 108. Any credit information required in the various embodiments, such as explanatory information, information about how a credit score is calculated, summary data, credit reports, credit score, etc., may be retrieved periodically and on demand, or cached in this manner.

The data gathering module 150 may also calculate any attributes required by the user interfaces implemented by the user interface module 110 (if any are required outside of default summary attributes). For example, summary credit attributes are typically calculated by credit bureaus that summarize credit data. These summary credit attributes can be requested along with, or as an alternate to, a credit report or credit score. However, the data gathering module 150 may also compile the summary attributes based on the credit report, or calculate custom attributes based on the credit report. For example, one summary attribute may comprise a calculation of the amount of available credit for a consumer. Such an attribute may be calculated based upon summing up all of the un-used credit available in a consumer's accounts. This final figure may then be associated with the credit report and stored in the data gathering module for later transfer to a client computing device 162. These calculations may be performed on demand or periodically.

In addition to retrieving credit reports, scores, and attributes, the data gathering module 150 may, in some embodiments, retrieve explanatory text about how the attributes involved may impact a credit score, and indications of whether a high or low value in an attribute may impact a credit score. These may be stored locally on disk within the credit data gathering module 150, or retrieved from a credit database 108. For example, a explanatory text and/or indicators may be retrieved from a credit bureau 108 and/or known in advance by the credit data gathering module 150. Based on the retrieved information, the credit data gathering module may alter or generate a score factors user interface (and/or other user interface) to reflect this information. For example, as shown in FIG. 5, one summary attribute may be how many maxed out credit cards a consumer has 505. Explanatory text, such as the text that appears in pane 507 may be used in a score factors user interface.

After retrieving and/or calculating the information, interaction (3) of FIG. 1 illustrates the credit report system 100 transmitting the credit information, via the network, to the computing device's 162 user interface module 110. This information may be transmitted using a text credit report format, an XML format, using web services APIs, or any other organized data structure or protocol for transferring the information between the credit report system 100 and the computing device 162. Alternatively, this information may be transmitted to the client computing device 162 as a part of a web page and accompanying web page user interfaces to be rendered with an app or a browser, such as software code configured to generate the various visual features of the credit summary user interface discuss herein. In this embodiment, the credit report system may act as a web page or web site configured to provide static, scriptable, or executable code and data that may be used to implement the entire invention, even with a client computing device 162 only capable of web browsing.

In interaction (4), the user interface module 110 may then store the received credit information, and parse the credit report, credit score, attributes, explanatory text, indications, or score master data that may be required to render the user interface in various embodiments. This may include organizing in a data structure one or more received attributes and other received information into such as explanatory text and indications by association. For example, system may match appropriate description text, explanatory text, attribute values, and indications together. The user interface module may be pre-programmed to recognize certain attributes as information for score factor categories to be used, and prepare the data structures appropriately. In some embodiments, the received information will also indicate which attributes to use and which score factor user interfaces to show, based on a selection of score factors made by the credit report system 100 or the credit bureau 108. Any additional attributes or summarization data may be calculated if needed based on the credit report or accompanying information for use in the user interfaces. As noted above, depending on the embodiment certain features discussed with reference to the user interface module 110 may be performed by the credit report system 100. Thus, the above-noted organization and calculations may be performed partially or entirely by the credit report system 100 in certain embodiments.

Figure 6:
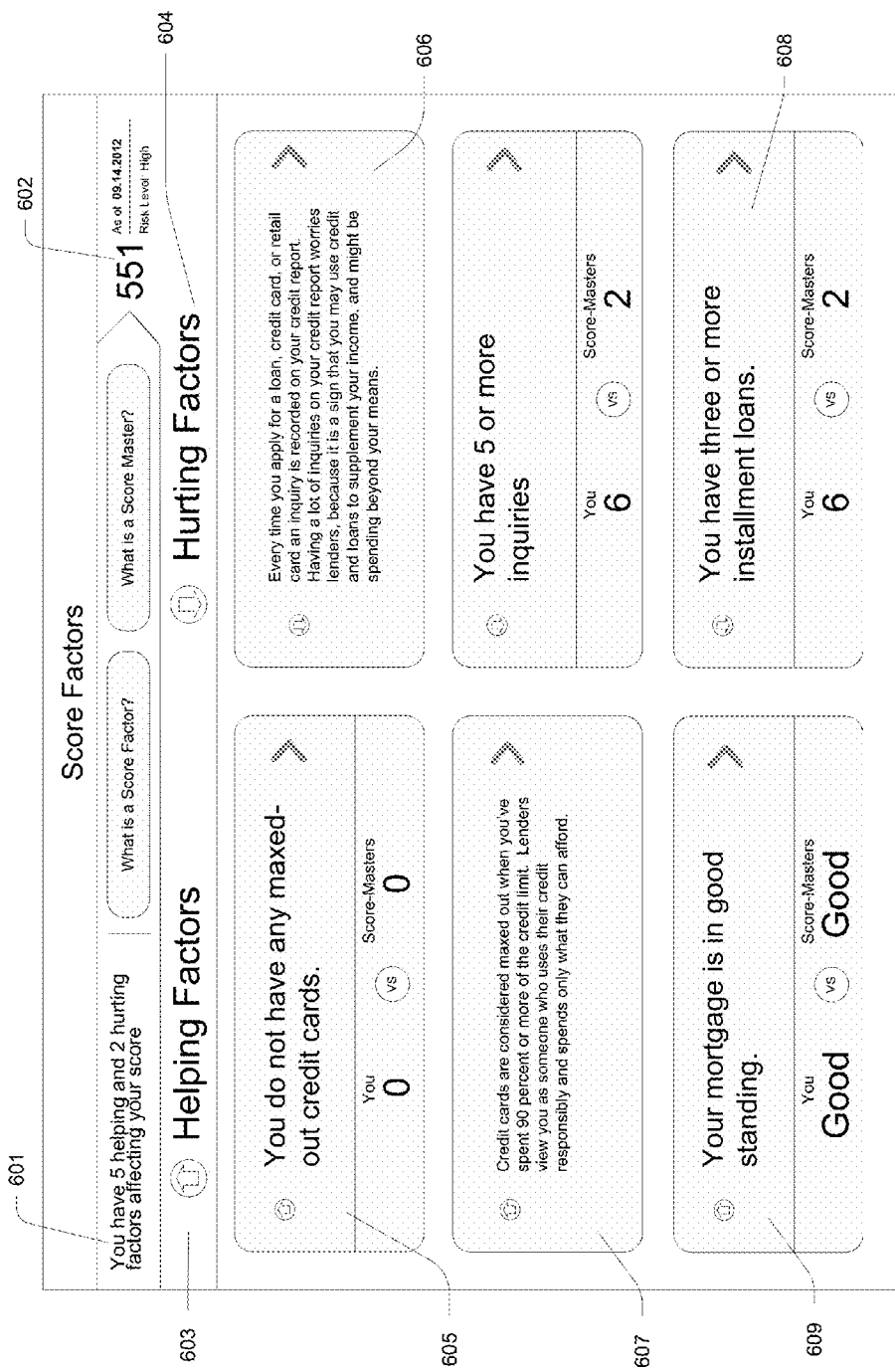
FIG. 6 is a sample flippable user interface for analyzing credit report data, as used in an embodiment.
Figure 7:
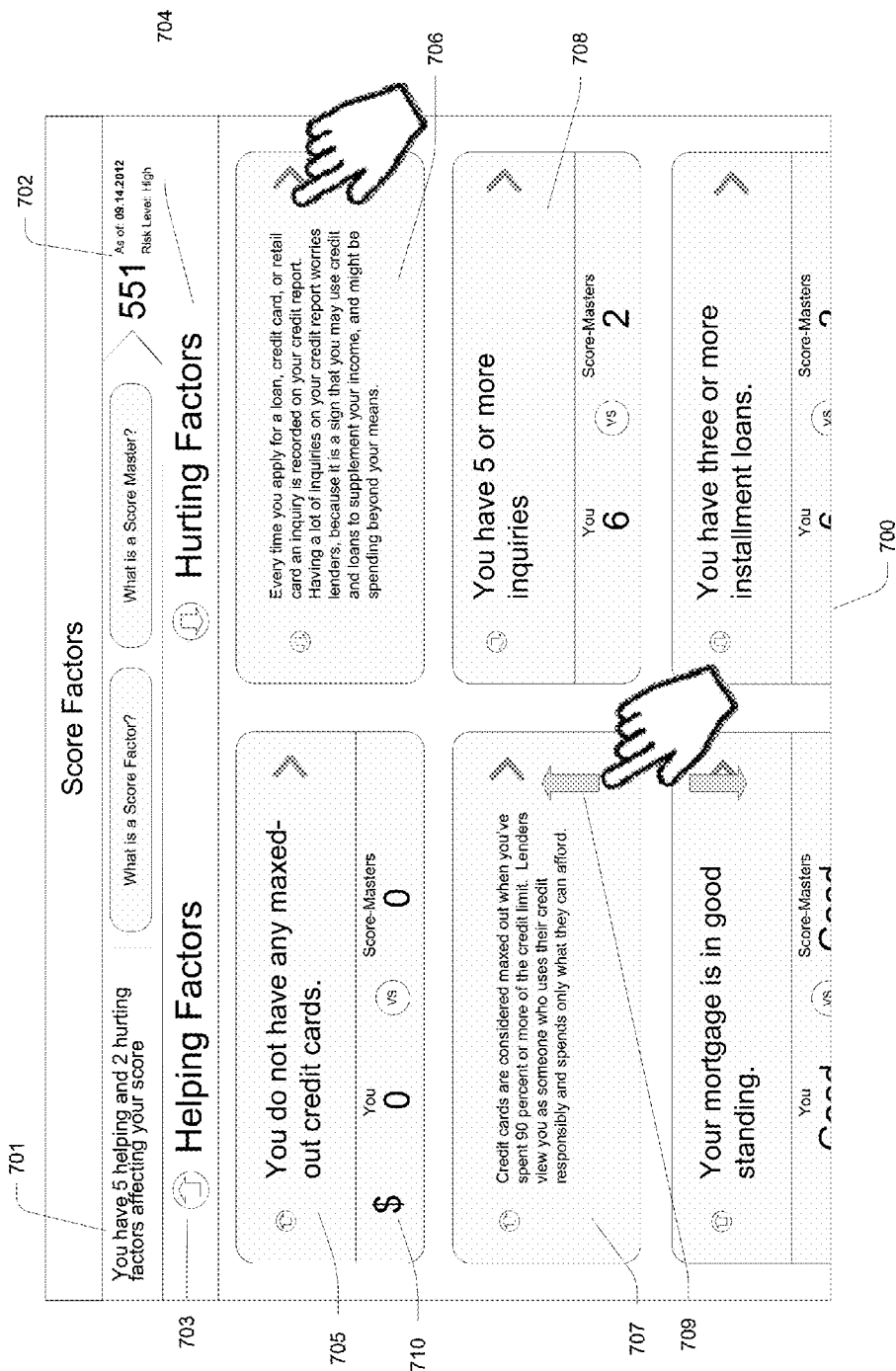
FIG. 7 is a sample flippable user interface for analyzing credit report data, as used in an embodiment.

Interaction (5) illustrates that, as described in more detail in FIG. 4 and its associated discussion, the user interface module 110 then displays a score factors user interface (also known as a flippable score factor pane user interface), where each score factor pane is based upon a selected summary or custom attribute, that may use associated explanatory text, positive or negative indicators, a short description, and a display of the attribute's value. In some embodiments, the pane may also display a comparison to score master information. By way of example, FIGS. 5-7 illustrate score factor user interfaces that may be used in some embodiments.

Optionally, in some embodiments, the summarized data/score factor information displayed in each score factor user interface pane may be linkable to a displayable portion of a credit report on the computing device 162. For example, by touching a specific piece of data within a score factor user interface pane or the score factors user interface, the user may be automatically directed to a portion of the user's credit report displaying detailed information related to the score factor. With reference to FIG. 5, for example, if the text "You do not have any maxed-out credit cards" 505 was touched, the computing device 162 and/or credit report system 100 may direct the user to a portion of their credit report listing all credit card account information, including each individual credit limit for each account and/or other data related to the user's total credit limit. Advantageously, this allows a user to easily browse and visualize a high level overview of their credit data and drill down into their detailed credit report for further information.

Credit Reports and Credit Bureaus

The credit report system 100 may be separate from a credit bureau or credit data database 108. One of the purposes of the credit report system is to interface with the credit bureau or any database that has data that will eventually be used in a user interface by computing device 162. The credit report system 100 may request and extract the appropriate credit data for a specific consumer based on a user using the computing device 162. This allows for a single point of contact for computing device 162 interaction. The credit report system 100 can then be configured to request from and receive data from credit bureaus or other credit databases.

Alternatively, the credit report system 101 may be executed by a credit bureau itself. In this case, the credit report system and the credit bureau functionality may be combined, with no need to transfer data over a wide area network between them. In some embodiments, the client computing device 162 may be configured to interact directly with a credit bureau over a network, to access a credit report and summary attributes. In this case, any custom attribute creation or processing needed must be performed by the computing device 162.

Example Method of Obtaining and/or Generating Data for Credit Summary User Interface FIG. 2 is a flowchart illustrating one embodiment of a method of retrieving a credit report and/or attributes/summarized credit data and generating data that may be used to render a score factors user interface, as well as possibly other user interfaces or sub user interfaces for display to the user. In various embodiments, fewer blocks or additional blocks may be included in the process, or various blocks may be performed in an order different from that shown in FIG. 2. In particular, the blocks in FIG. 2 may be performed by computing device 162, credit report system 100 or credit database/bureau 108 (or any combination thereof), depending on which computing device/software service has access to the required credit data.

As one skilled in the art would recognize, credit bureaus make their data available to consumers and businesses, usually (but not limited to) for the purpose of checking a consumer's credit history and credit score. A credit bureau's credit report may include, among other things, data concerning payment history (such as current accounts and late payments), credit usage and availability, the age of financial accounts, the types of financial accounts, and inquiries into credit reports or credit scores. This data may be collected from one or more raw data sources 166 (FIG. 1) which may comprise information from consumers' banks, mortgagors, lenders, creditors, services, utilities, public records, and other institutions where a consumer holds a financial account. The data may include a status of each account, such as when the last bill was paid, how late a recent payment is or how behind a consumer is on their account, a payment history, the available credit allowed in an account, the account balance, and when an account was opened and/or closed, among other credit information.

Beginning in block 200, the requestor, for example the credit report system's 100 credit data gathering module 150 (or in some embodiments, the computing device itself 162) issues a request to a credit bureau or other credit database for credit information about a consumer, such as a credit report, and associated attributes. The request may be issued by sending it over an electronic wide area network, such as the Internet. The credit bureau receives this request, and may, if necessary, charge and/or authenticate the requestor by methods known in the art.

Next, in block 201, the credit bureau 108 may (if necessary) access credit information about a consumer to make a credit report and other credit summary information. This can be done by accessing information precollected from raw data sources 166.

Moving to block 202, the credit bureau may then either access/retrieve cached, precalculated, and/or precompiled credit data specific to a consumer, such as a credit report, score, attributes about the consumer, score factors that apply specific to the consumer, explanatory text related to each attribute/score factor, a positive or negative indication for each score factor. For example, based on information periodically collected by the credit bureau 108 from raw data 166 sources disclosed above, the credit bureau 108 may have precompiled credit information into a credit report and other related credit information in advance.

Alternatively, this information may be determined based on information accessed and compiled in block 201. For example, in some embodiments, such as the one illustrated in FIG. 2, the credit bureau 108 may then use the accessed credit information to calculate a credit score usually based on a proprietary formula 202. The credit bureau may also calculate and/or create the attributes that are often associated with a credit report. These attributes may be summary variables/attributes (that may correspond to a score factor) that summarize data related to individual accounts. For example, one STAGG attribute (an example type of summary attribute) may be a calculation of the total max credit for all credit card accounts, which may correspond to a score factor. A positive or negative indication, or explanatory text, of each score factor may be determined or accessed based on how the formula uses the score factor to determine its credit score.

In block 203, the score factor user interfaces, credit report, the credit score, positive or negative indications, explanatory information, score master information, and/or the summary attributes may be transmitted back to the requestor, such as the credit report system 100, and stored within the requestor's data storage such as a hard drive. In block 204, any additional attributes to be used by the client device are calculated that were not included in the attributes calculated by the credit bureau (or alternatively, these attributes may be calculated at the client computing device 162). Such a calculation is based on the information received by the requestor such as the credit score, credit report information (e.g. account trade lines, etc), and received attributes. These may be different summary attributes than the default summary attributes. In block 205, the credit report, credit score, and all required attributes may be transmitted to the computing device 162 if necessary, and stored within its data storage 162.

In some embodiments, the system distinguishes between the initial transmission of credit data required for user interfaces, and subsequent transmissions of user interface data so that it may transmit only portions that are necessary to update a score factor user interface for new credit data. This may be done, for example, using an XMLHttpRequest (XHR) mechanism, a data push interface, or other communication protocols.

In block 204, if the credit bureau did not provide score master information, score master values for each score factor may be accessed by the credit report system 100 or computing device 162. This may be precached on the credit report system 100, or be determined based on information collected by the credit report system 100 from credit bureaus. Information on how to determine score master information is further described herein. If necessary, all of this information may then be transferred to computing device 162 in block 205. In other embodiments, the actual credit data may not be transmitted to the computing device 162 and, rather, software code (e.g., HTML, Java, Perl, Ruby, Python, etc.) may be transmitted to the computing device 162. For example, code that is usable by the computing device 162 to render the credit summary user interface may be transmitted, without transmitting a data structure that separately includes the actual credit data.

Example Method of Providing Score Masters Values to a User

Figures 3A, 3B:
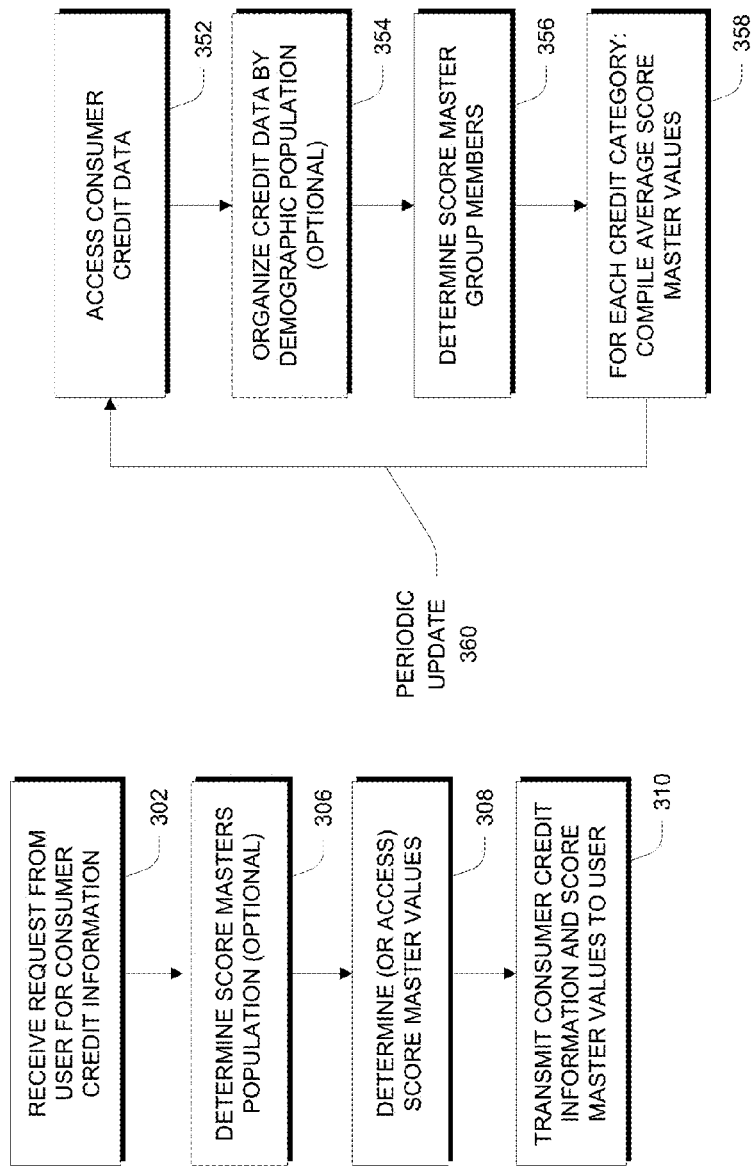
FIG. 3A is a flow diagram depicting an illustrative operation of the credit report system in which score master values are presented to a user, according to an embodiment of the present disclosure.
FIG. 3B is a flow diagram depicting an illustrative operation of the credit report system in which score master values are determined, according to an embodiment of the present disclosure.

FIG. 3A is a flow diagram depicting an illustrative operation of the credit report system in which score master values are presented to a user, according to one embodiment of the present disclosure. In various embodiments, fewer blocks or additional blocks may be included in the process, or various blocks may be performed in an order different from that shown in FIG. 3A. In particular, the blocks in FIG. 3A may be performed by computing device 162 and/or credit report system 100, or credit bureau 108 (or any combination thereof), depending on which computing device/software service has access to the required credit data. The following description of retrieving and/or determining score master information may occur separately, or at the same time as, and as a part of the same request for, score factor credit data.

Beginning at block 302, a request is received from the user or consumer for consumer credit information. The request may specify, for example, that the user would like to view credit information and comparison of the consumers credit information to a group of score masters, such as in the sample user interface of FIG. 5. The request may be transmitted by the computing device 162 to the credit report system 100, for example. The request may be issued by sending it over an electronic wide area network, such as the Internet. The credit report system 100 and/or credit bureau 108 receives this request, and may, if necessary, charge and/or authenticate the requestor by methods known in the art.

Next, at optional block 306, the credit report system may optionally determine a score masters population of interest. In an embodiment, a user may specify, through the computing device 162, a particular demographic of interest to the user. Such a specification may be included in the request provided to the credit report system. For example, the user may only be interested in comparing their own credit scores and/or attributes to others that are located in a similar geographic region. In another example, the user may only be interested in a comparison with others having a similar income level to the user. Examples of demographics that may be specified may include, but are not limited to, gender, ethnicity, employment status, geographic location, net worth, and income level, among others. Examples of geographic locations that may be specified may include, but are not limited to, a neighborhood, a city, a county, a state, and a country. In an embodiment, one or more demographics may be specified. In an embodiment, the demographic specified may be associated with the user manually and/or automatically. For example, the credit report system 100 may automatically determine (based on the user's credit data, for example), the user's gender, address, and/or income level, among other examples. The system may then automatically specify the relevant demographic, for example, the population of individuals in the user's home state.

At block 308, score master values are determined and/or accessed (if they were previously determined). Analysis module 106 may determine score masters values for relevant demographics (if a demographic populations was specified) using the data retrieved and/or accessed in block 304. As mentioned above, in general, a score master is a person who is considered low risk by, for example, banks and/or lenders, and who has an excellent credit score, for example, an overall credit score between 726 and 830. In an embodiment, the term "score masters" refers to a group of persons who each have excellent credit scores. In another embodiment, "score masters" may refer to a group of persons that, taken together, on average have an excellent credit score. In an embodiment, the group of score masters may be limited to individuals having associated characteristics that fall within the specified demographic (as described above).

In some embodiments, one or more score master's credit statistics may be used to identify characteristics about good credit scores. A score master is a broad term, but may refer to a member of the score masters group that is comprised of a group of consumers that have high credit scores. For example, a threshold credit score such as 726 or above may be selected as a score master credit score by an administrator and/or automatically by the credit report system. If a consumer's score is 726 or above, he or she may be considered a member of the score masters set. Additional factors may also be used to determine if a consumer is a member of the score masters set, such as whether a consumer is considered low risk by lenders. Additionally, as described above, in the instance in which a demographic population is provided, only those score masters having the relevant characteristics may be considered part of the score masters set. In an embodiment, the threshold credit score may be predetermined by the credit report system, a credit bureau, and/or a user of the credit report system (such as the user). In an embodiment, the threshold credit score may be 850, 840, 830, 820, 810, 800, 790, 780, 760, 750, 740, 730, 720, 710, 700, 690, 680, 660, 650, 640, 630, 620, 610, 600, 590, 550, and/or any other credit score.

Once the score masters group or set is determined, in some embodiments the average inputs for a score master that are useful for comparison are calculated. For example, some embodiments may determine the average maxed-out credit cards for a score master, the average mortgages in good standing for a score master, the average amount of public records attributed to a score master, the average age of accounts for a score master, the average payments missed, the average number of credit inquiries per month, among others. These averages may be based on mean, median, or mode or other complex criteria used to determine a typical value for a member of the score master set. The calculated values may be averaged of the entire group of score masters, for example.

These average values, once calculated, may be used for comparison to a consumer's credit score, such as the credit score of the credit data gathering module 150. For example, if the data gathering module 150 has six credit inquiries and a score master has typically two credit inquires, showing this comparison to a user may give the user the idea to lower their credit inquiries so that their credit score inputs align more closely to a score masters, resulting in a potentially higher credit score. In as embodiment, credit scores or score factors are calculated for a number of different credit categories which are described below in reference to FIGS. 5-7. While averages of credit attributes of score masters are discussed herein, in other embodiments other (or additional) mathematical operations may be applied to aggregate data associated with multiple score masters, such as an arithmetic mean, median, mode, standard deviation, range, etc., of a group of consumers that meet the score masters criteria (whether default criteria set by the system or custom criteria set by a consumer).

Comparison either to the threshold credit score for a score master, or comparison of the inputs to score masters can be used to determine whether a user of the simulation or visualization of credit data is on track to be a score master, or is already a score master. For example, having a number of credit score inputs that are better than a score master's input, such as having one credit inquiry per month whereas the average for score master's is two, may determine whether a user should be given a special status, such as the title score master, or receive a progress indicator or badge indicators that show score master status for all, one, or some credit score input categories. Examples of score master comparisons may be seen in FIGS. 5-7, which are described below.

In an embodiment, score masters information is provided from the credit bureau 108. For example, score masters values may be precalculated by the credit bureau and stored in the credit bureau 108, where they may be accessed by the credit data gathering module 150. In an embodiment, score masters values may be cached by the credit report system 100 for rapid reuse.

At block 310, the complied information, including the consumer credit information and scores, and the score masters values and scores may be transmitted to the computing device 162 for display in a user interface to the user. In other embodiments, the actual credit data may not be transmitted to the computing device 162 and, rather, software code (e.g., HTML, Java, Perl, Ruby, Python, etc.) may be transmitted to the computing device 162. For example, code that is usable by the computing device 162 to render the user interface may be transmitted, without transmitting a data structure that separately includes the actual credit data. In some embodiments, the system distinguishes between the initial transmission of credit data required for user interfaces, and subsequent transmissions of user interface data so that it may transmit only portions that are necessary to update a score factor user interface for new credit data. This may be done, for example, using an XMLHttpRequest (XHR) mechanism, a data push interface, or other communication protocols.

FIG. 3B is a flow diagram depicting an illustrative operation of the credit report system 100 or credit bureau 108 in which score master values are determined, according to an embodiment of the present disclosure. In various embodiments, fewer blocks or additional blocks may be included in the process, or various blocks may be performed in an order different from that shown in FIG. 3B. In particular, the blocks in FIG. 3B may be performed by computing device 162, credit report system 100, and/or credit bureau 108 (or any combination thereof), depending on which computing device/software service has access to the required credit data. The process of FIG. 3B may be performed, for example in blocks 302-308 of FIG. 3A.

Starting at block 352, consumer credit data is accessed by the credit report system 100. Then, at optional block 354, if one or more demographic populations have been specified (as described in reference to block 306 of FIG. 3A), the accessed credit data is organized according to the demographic. Thus, for example, if the user has specified a geographic location including the State of California, credit data that falls into that geographic location will be assembled.

Next, at block 356, the score masters group or set members are determined. This step is accomplished substantially as described in reference to block 308 of FIG. 3A. In general, only those individuals considered to have excellent credit, and/or to be low risk, are determined to be score masters. The score masters group may be further defined by any demographic specification that may have optionally been provided. Continuing with the example above, only individuals who, for example, reside in California may be selected by the credit report system.

At block 358, for each of the credit categories (described above and as further listed and described below) score masters scores are calculated from the determined group of score masters.

In an embodiment, score masters scores may periodically be updated, as indicated by the arrow 360. Periodically updating the score masters scores provides the user with up-to-date comparisons between their own credit scores and the archetypal score masters scores. In an embodiment, the user's scores may also be updated periodically. In an embodiment, the score masters and/or users scores are updated yearly, quarterly, monthly, weekly, and/or daily, among other time periods.

In an embodiment, credit categories (and/or score factors) may be predetermined by the credit bureau and/or the credit report system 100. Alternatively, credit categories (and/or score factors) may be determined by the credit report system 100 during the determination of the user's credit scores. For example, the credit report system 100 may determine relevant credit categories based on the specified demographic population, and/or the user's credit data. In an embodiment, more or fewer of the credit categories for which scores are calculated may be displayed to the user.

Example Method of Displaying and User Interactions with a Score Factors User Interface FIG. 4 illustrates a method that may be implemented by the user interface module 110, one or more modules of the credit report system, and/or other related software and hardware that allows the discussed user interactivity. In various embodiments, fewer blocks or additional blocks may be included in the process, or various blocks may be performed in an order different from that shown in FIG. 4.

In block 401, the client device receives the information from either credit report system 100 or another credit database or credit bureau, as described in FIG. 2. This information may then be stored for convenient access within the device during a user application sessions, or across user sessions. The data may be stored in a data structure using any number of formats such as a relational database, XML data, HTML data, common separated values (CSV) data, or other formats.

Throughout the method described in FIG. 4, the credit report system 100 or credit bureau 108 may transmit user interface data or credit report data, such as summary attributes, positive or negative score factor indications, explanatory information, etc., to the computing device 162. The updated data may be used then by the client computer to update the displayed user interfaces (e.g., the score factor user interface panes) so that the user may see the information. For example, a user may relaunch the application and upon relaunch, the user interface module 110 may perform an additional request to refresh its stored credit information for a consumer in order to display the most up to date information. For example, in some embodiments, after a selection of a score factor interface pane (explained below), the user interface module 110 may query the credit report system or credit database/bureau 108 for explanatory information to be displayed for that score factor in real-time. This may be accomplished using, by way of example, AJAX or web services, or any remote API.

Next, in block 402, in some embodiments, the computing device 162 may receive from the credit report system 100 or the credit bureau 108 summary information about score masters. This may include summary attributes for average score masters that correspond to a score factor category that may be displayed in a user interface. This data may be used in order to display a comparison between a consumer's specific score factor score and an average score factor score for a user with a high credit score.

Moving to block 403, one or more score factor user interface panes may be generated for a particular score factor, such as a particular summary attribute that affects the consumer's credit score. Score factor interface panes, such as example score factor interface pane 453 (and others examples in FIGS. 5-7) may comprise a description of the score factor/attribute 460, such as one or more score factor conditions that affect a consumer's credit score, an indication of whether the score factor helps or hurts the consumer's credit score 459, and a value of the attribute/score factor based on the specific consumer's credit data. It may also include a visual indicator of the approximate area 471 to touch in order to "flip" the score factor user interface pane in order to display explanatory text (or other related information) about the score factor. In addition, in some embodiments, a score master value 473 may be displayed in comparison to the consumer's value for the same score factor.

As shown in FIGS. 5-7, multiple score factors are shown in each user interface example. The factors shown in some embodiments may be a subset of all the total score factors that are available. Some score factors may not be shown because score factors may be eliminated based on preconditions. For example, score factor interface pane 453 in FIG. 4 describes a score factor about the number of credit inquiries. The description text 460 for the score factor is "You have 5 or more credit inquries" which uses conditional language. Thus, if this condition is not true (e.g., the consumer's credit information shows there were less than 5 credit inquiries), the score factor user interface pane for that score factor may not be shown to the consumer. By eliminating some score factors based on conditions, a consumer may only be shown a subset of the total score factors that apply specifically to their credit information. This reduction allows a consumer to focus on those score factors that are impacting their credit score the most.

In some embodiments, the score factor may change given a certain threshold. For example, if a consumer has less than 5 credit inquiries, the indicator 459 may instead be a positive indicator rather than the negative indicator shown. In other words, based on how a particular credit score of a consumer matches up to conditions of score factors, there may be multiple score factors associated with an attribute, such as number of credit inquiries. Here, in this example, if the number of inquiries attributes is less than 5, a score factor user interface may be shown indicating a positive score factor. If the number of inquiries is 5 or greater, a score factor interface pane may be shown indicating a negative score factor 459.

In some embodiments, the score factor user interface panes to be generated and displayed may be selected by the computing device 162 (and/or the credit report system 100). For example, a configuration user interface may be displayed that queries the user to identify score factors the user is most interested in. In other embodiments, the specific score factors selected to be displayed may be sent to the computing device 162 and determined by either the credit report system 100 or credit bureau 108. For example, either system may determine and use the impact of each score factor on the consumer's credit score to select the most impactful score factors to display.

Furthermore, in some embodiments, the user interface module 110 may filter, sort, order, and/or otherwise organize the score facture user interface panes. For example, FIG. 6 illustrates multiple score factors in various states. On the left side, helping (positive score) factors may be displayed 603. On the right side, hurting (negative score) factors may be displayed 604. The order that the score factors are listed may be in order of importance. For example, the helping factors may be listed in the order of those that have the greatest positive impact on the consumer's credit score. The hurting factors may be listed in the order of those that have the greatest negative impact on the consumer's credit score.

The order may be determined by anyone one of the credit reporting system 100, credit bureau 108, or the computing device 162. For example, the indications of positive or negative score impact transferred to the computing device in some embodiments may be used to order the score factors. In this embodiment, the indications may be in the form of comparable scalar values of positivity or negativity in impact. These exact indications may have been calculated by either the credit reporting system 100 or the credit bureau 108. In some embodiments, the credit bureau 108 or credit report system 100, or computing device 162 may analyze the credit report or raw credit data to determine which score factor has the greatest impact. In most cases, this will be performed by credit reporting system 100 or credit bureau 108 unless the computing device has specific knowledge (e.g. via transfer) of the credit score algorithm.

In addition, in some embodiments, as part of generating and displaying a particular score factor user interface pane, a comparison with a score master 473 may be displayed. As described earlier, score master data for a variety of summary credit attributes/score factors may be calculated usually by the credit report system 100 or credit bureau 108, and transferred to the computing device 162. The computing device 162 may matchup the score master factors values with the consumer's score factors, and then display them side by side within the score facture user interface pane. Advantageously, this allows a consumer to view the credit score in comparison to a relatively good credit score within a certain geographic area. Using this information, the consumer can analyze their credit information and determine which area of their credit score to improve.

Next, in block 404, the user interface module may then receive input from a touch screen on the computing device 162, or any other user input device. For example, using a touch screen, a user may press and hold a portion of one of the score factor user interface panes (e.g., pane 453 in FIG. 4), or alternatively using other input means such as a mouse. For example, a user may touch and hold down their finger (or simply tap their finger, any input signal is contemplated) 481 on sample score factor user interface pane 453 as depicted in FIG. 4 within a limited area of the pane (e.g. near the ">" icon, or within the entire card). By doing so, as described in block 405, the user interface module 110 may flip the information shown in the touched score factor user interface pane 480 (e.g., as shown in FIG. 4A illustrating a flip around the vertical axis, or a flip around a horizontal or any other axis).

In block 406, the visual flip animation may end with a display of the "reverse" side of the score facture use interface pane. In this case, explanatory text associated with the score factor 482 may be displayed on the reverse side. The explanatory text may describe to the user, among other things, how the score factor is impacting the consumer's credit score and the reasons the underlying score factor data is important to creditors. In some embodiments, the explanatory text may be associated with the score factor and does not change depend on the consumer's credit information. In some embodiments, the explanatory text may be dynamically changed or generated based on the summary attribute associated with the score factor. For example, some score factors may be associated with a mapping of a range of summary attribute values for the score factor. Based on the specific range the summary attribute falls in, a different explanatory text may be displayed. In this manner, the specific explanatory text may be customized based on the consumer's credit data.

In some embodiments, the visual flip animation may flip multiple times, with the final ending position displaying the reverse explanatory text side of the card/score facture user interface pane. Similarly, in some embodiments, the flip speed may be altered during the animation. For example, the score factor user interface pane may flip multiple times, where the flips slowly slow down as the score factor user interface pane comes to rest on the reverse side.

In block 407, a user may touch the reverse side of the score facture user interface pane via touch screen input (or alternatively using other input means such as a mouse). This may be a configured area of the reverse side of the score factor user interface pane, or the entire pane itself. Upon receiving the touch screen input, in block 408 the user interface module 110 may again flip the score factor user interface pane to display again the "front" portion of the score factor user interface pane 458 (as shown in FIG. 4B), as was described for flipping to the reverse side above.

Example User Interfaces

FIGS. 5-7 illustrate a sample score factors user interface with the various user interface controls within the score factors user interface, such as score factor user interface panes. In various embodiments, the user interfaces shown in FIGS. 5-7 may be presented as a web page, as a mobile application, as a standalone application, or by other communication means. In other embodiments, analogous interfaces may be presented using audio or other forms of communication. In an embodiment, the interface shown in FIGS. 5-7 are configured to be interactive and respond to various user interactions. Such user interactions may include clicks with a mouse, typing with a keyboard, touches and/or gestures on a touch screen, voice commands, and/or the like. The systems and methods described herein are compatible with various types of input in addition to, or as a replacement for, the touch screen input described.

As described above, FIG. 5 illustrates a sample score factors user interface 500 for a specific individual consumer (who in some embodiments may be the user of the client computing device 162 and its user interface module 110). Various summary attributes/score factors and other data related may be displayed in addition to score factor user interface panes. For example, an area of the user interface may display the total number of score factors displayed 501, including the number of helping score factors affecting the specific consumer's score and the number of hurting score factors affecting the specific consumer's score. In addition, the user interface may display the consumer's credit score 502, including a grading of the value of the credit score (such as high, medium, low risk, etc.), and how up-to-date the credit report data being used is regarding this consumer (i.e. how recently the consumer's credit data was downloaded from credit report system 100 or credit bureau 108). As described above, the factors may be listed by whether they are helping factors 503, or hurting factors 504. In addition, a visual indicator may be associated with helping or hurting factors, such as an up or green color arrow for a helping factor 509, or a down or red color arrow for a hurting factor 510. The user interface may also include the score factor panes such as 505 (front side displayed), 506 (reverse side displayed), 507, and 508, which may be manipulated as described under FIG. 4.

FIGS. 6 and 7 also display other embodiments of user interface module's 110 display of a score factors user interface. These embodiments show alternative layouts, which may include listing additional score factors. In FIG. 7, the layout may allow a user to scroll among multiple pages of score factor listings by scrolling with a mouse wheel or vertically sliding a finger on the touch screen 709.

In some embodiments, areas within the score factor user interface panes may be functionally linked to detailed information in a consumer's credit report. For example, for the score factor "You do not have any maxed-out credit cards" 705 displayed in FIG. 7, the "0" attribute under the "You" text may be linkable to more detailed information in the consumer's credit report. By touching or clicking on the "You" or "0" (or any other appropriate related area), a user may be redirected to a second user interface such as the one illustrated in FIG. 8. FIG. 8 shows a consumer's credit accounts, including the consumer's credit cards that are not maxed out under the score factor. In this manner, a user may be able to dive straight into the credit report data that is impacting their credit score in a way described by the score factor.

Score Factor/Summary Data Categories

Score factors may cover a variety of summary credit categories that affect your credit score. For example, score factors may include, but are not limited to, those listed in the table below.

| Positive/Negative Impact on Credit Score | Score Factor Condition/Category of Summary Information ("you" or "your" refers to a specific consumer) |
| --- | --- |
| Negative | You have one or more missed payments. |
| Negative | You have one or more Public Records. |
| Negative | Your average age of accounts is less than 5 years and 11 months. |
| Negative | You have five or more inquiries. |
| Negative | You do not have any open credit cards. |
| Negative | Your average credit card limit is less than $2,000. |
| Negative | You have three or more installment loans. |
| Negative | You are currently behind on your mortgage. |
| Negative | You have one or more credit cards maxed out. |
| Negative | Your credit-to-debt ratio is more than 51%. |
| Negative | You do not have a mortgage account in good standing. |
| Negative | Your oldest account is less than six months old. |
| Negative | Your credit file hasn't been updated in six months. |
| Positive | You have never missed a payment. |
| Positive | You do not have any Public Records. |

| Positive/Negative Impact on Credit Score | Score Factor Condition/Category of Summary Information ("you" or "your" refers to a specific consumer) |
|---|---|
| Positive | Your average age of accounts is more than 7 years and 8 months. |
| Positive | You have less than two inquiries. |
| Positive | You have two or more open credit cards. |
| Positive | Your average credit card limit is more than $5,000. |
| Positive | You have no installment loans. |
| Positive | Your mortgage is in good standing. |
| Positive | You do not have any maxed-out credit cards. |
| Positive | Your Credit Used is less than 16%. |

In other embodiments, more or fewer score factors may be used. The condition levels may be different in other embodiments. For example, the condition level for a positive impact on a consumer's credit scores based on credit used may be 10%, rather than the 16% listed in the table above.

Each of the above score factors may have associated explanatory text that can be viewed in order to reveal more information related to that score factor, such as how the score factor condition is affecting your credit score. In some embodiments, the score factor explanatory text may also display a measure of the impact of this particular score factor on your credit score. For example, it may show that, absent this score factor applying to the consumer's credit score, the consumer's credit score would have gone up or done by a certain number of points.

Score Factor Badges and Rewards

In some embodiments, badges may be awarded to a consumer based on the consumer meeting or exceeding the average score master's score in the score factor categories. Such score badges may be displayed on each score factor user interface pane in the form of an icon. The icon may appear on the score factor user interface pane when the consumer has met score factor related conditions. For example, FIG. 7 displays a dollar sign icon 710 in the lower left of score factor user interface pane 705. This dollar sign icon may represent that the consumer has earned a badge for this score factor.

For example, in some embodiments, a consumer may receive a certain badge appearing on a score factor when they meet a preset threshold associated with the score factor value. This preset threshold may correspond to the conditional value required to display the score factor, or, this preset threshold may correspond to a different threshold value. The preset threshold may also correspond to meeting or exceeding a score master value. In some embodiments, more than one badge may be associated with a score factor, where each badge corresponds to a different threshold. For example, some score factors may have gold, silver, and bronze badges, where the gold badge may correspond to a score factor threshold value that will give the best effect on the credit score, and the silver and bronze badges correspond to thresholds of lesser positive impact on credit score.

The badges for a consumer may be publicized to a user's Facebook account or twitter (or any other social media or website) via application program interfaces for automatically sending and posting data to those sources, among other methods. In addition, some embodiments may provide an overall "score master" status based upon meeting the score master thresholds for a set number of score factors, or reaching a certain level of credit score. Some embodiments may also include configurable notifications (SMS, text, email, sound, phone) when awarded a score factor badge or otherwise reaching a score factor threshold.

In some embodiments, badges need not be used, but any reward mechanism may be used to signify to a consumer or the public that the consumer has met predetermined thresholds related to score factor conditions. For example, instead of earning badges, a consumer may receive gift certificates, special promotions and coupons, ribbons, digital property in games, etc.

The badges may be calculated and tracked either on the computing device 162, or by credit bureau 108 or credit report system 100, and transferred to other computing systems such as Facebook via electronic communication over network 160 for additional display.

Example System Implementation and Architecture

Figure 9:
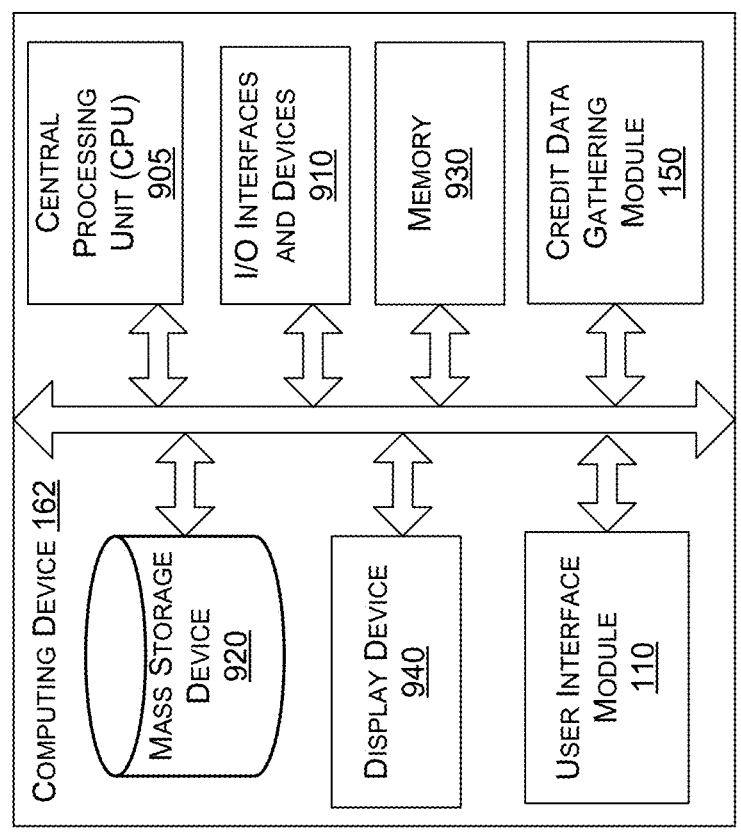
FIG. 9 is a sample block diagram representing hardware and/or software components of an example embodiment.

FIG. 9 is a block diagram showing an embodiment of a computing device 162, which may be in communication with network 160 and various computing systems, such as credit report system 100 and credit bureau/database 108, that are also in communication with the network 160. The computing device 162 may be used to implement systems and methods described herein.

As described above, some embodiments may include portions that are executed by the credit report system 100 and/or by the computing device 162, or are entirely executed by the credit report system 100 or the computing device 162. Thus, discussion herein of any structure (e.g. cpu, memory, etc) of the computing device 162 or operations performed by the computing device 162 or user interface module 110 may be equally applied to the credit report system 100, Furthermore, other computing systems may also perform all or some of the processes discussed with reference to the user interface module 110.

The computing device 162 includes, for example, a personal computer that is IBM, Macintosh, iOS, Android or Linux/Unix compatible or a server or workstation. In one embodiment, the computing device 162 comprises a server, a laptop computer, a smart phone, a personal digital assistant, a kiosk, or an media player, for example. In one embodiment, the exemplary computing device 162 includes one or more central processing unit ("CPU") 905, which may each include a conventional or proprietary microprocessor. The computing device 162 further includes one or more memory 930, such as random access memory ("RAM") for temporary storage of information, one or more read only memory ("ROM") for permanent storage of information, and one or more mass storage device 920, such as a hard drive, diskette, solid state drive, or optical media storage device. Typically, the modules of the computing device 162 may be connected to the computer using a standard based bus system 980. In different embodiments, the standard based bus system could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of computing device 162 may be combined into fewer components and modules or further separated into additional components and modules, and executed in software, hardware, or a combination of hardware and software.

The computing device 162 is generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, or other compatible operating systems. In Macintosh systems, the operating system may be any available operating system, such as MAC OS X. In other embodiments, the computing device 162 may be controlled by a proprietary operating system. Conventional operating systems control and schedule computer processes for execution, perform memory management, provide file system, networking, I/O services, and provide a user interface functionality usable by the user interface module 110, such as a graphical user interface ("GUI"), among other things.

The exemplary computing device 162 may include one or more commonly available input/output (I/O) devices and interfaces 910, such as a keyboard, mouse, touchscreen, and printer. In one embodiment, the I/O devices and interfaces 910 include one or more display devices, such as a monitor or touchscreen 940, that allows the visual presentation of data to a user. More particularly, a display device provides for the presentation of GUIs, application software data, and multimedia presentations, for example. The computing device 162 may also include one or more multimedia devices, such as speakers, video cards, graphics accelerators, and microphones, for example.

In the embodiment of FIG. 10, the I/O devices and interfaces 910 provide a communication interface to various external devices. In the embodiment of FIG. 10, the computing device 162 is electronically coupled to a network 160, which comprises one or more of a LAN, WAN, and/or the Internet, for example, via a wired, wireless (such as 802.11 networks or a cell phone network), or combination of wired and wireless, communication link. The network 160 communicates with various computing devices and/or other electronic devices via wired or wireless communication links.

According to FIG. 10, in some embodiments information may be provided to the computing device 162 over the network 160 from a credit report system 100 and/or a credit bureau or database 108. The credit report system 100 and the credit bureau/database 108 may include one or more internal and/or external data sources. The data sources may include internal and external data sources which store, for example, credit bureau data and/or other consumer data. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

In the embodiment of FIG. 10, the computing device 162 includes a user interface module 110 that may be stored in the mass storage device 920 as executable software codes that are executed by the CPU 905. This and other modules in the computing device 162 may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 10, the computing device 162 is configured to the execute the user interface module 110 in order to for example, receive credit report and summary attributes regarding a specific consumer, generate score factor user interfaces, access and display summary credit data for a specific consumer, receive touch screen input, flip score factor user interface panes according to the received input, display explanatory text regarding the credit data, and perform other methods as described herein (such as the processes described with respect to FIGS. 2-4).

User interface module 110 may generate and/or render a score factors user interface (comprising one or more score factor user interface panes) based on the received credit information. By interacting with these user interfaces, a user of computing device 162 may view and learn about how their scores in summarized categories may affect their credit score. Exemplary embodiments of user interfaces presented by such a section is shown in FIGS. 5-7.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, such as the computing device 162, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Like the computing device 162, credit report system 100 and credit bureau/database 108 may comprise similar computing hardware, software, and functionality as described above for computing device 162.

Other

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the consumer computing device 162, credit report system 100, and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. Non-transitory computer storage that comprises executable instructions configured to cause one or more computer processors to perform operations comprising:
   receiving, via a computer network, from a touch sensitive computing device of a user, a request for information regarding how a credit score of the user is positively impacted by various activities of the user and how the credit score of the user is negatively impacted by other various activities of the user;
   receiving, from a remote computing system storing credit information, first credit information associated with the user, wherein the first credit information comprises indications of a plurality of categories and corresponding category data for each category, the plurality of categories and corresponding category data including at least:
      a credit utilization category and associated credit utilization data of the user including a credit utilization percentage indicating a percentage of total credit used by the user compared to a total credit available to the user across a plurality of credit lines associated with the user;
      a credit inquires category and associated credit inquiry data of the user including a quantity of credit inquiries associated with the user in a predetermined prior time period; and
      a payment history category and associated payment history data of the user indicating a quantity of missed payments associated with the user in a predetermined prior time period;
   for each of the plurality of categories:
      accessing a data structure storing rules describing influences of the categories on credit scores, the rules indicating a plurality of conditions associated with impacts on credit scores of users, each of the rules in the data structure including
         a logical condition associated with the category; and
         an indication of whether satisfaction of the logical condition negatively or positively impacts credit scores;
      accessing category data of the user associated with the category;
      applying the logical condition to the category data to determine whether the logical condition is met by the category data, including:
         for the credit utilization category, determining whether the credit utilization percentage of the user exceeds a credit utilization threshold indicated in a credit utilization logical condition associated with the credit utilization category;
         for the credit inquiries category, determining whether the quantity of credit inquires associated with the user exceeds a credit inquires threshold indicated in a credit inquiries logical condition associated with the credit inquires category; and
         for the payment history category, determining whether the quantity of missed payments associated with the user exceeds a missed payments threshold indicated in a payment history logical condition associated with the payment history category;

based on said applying the logical condition to the category data, identify one or more logical conditions that are met;

for each identified logical condition that is met, access the data structure to determine whether the met logical condition is associated with a negative impact or positive impact on credit scores;

generating user interface data configured for inclusion in one or more interactive user interfaces rendered on the touch sensitive computing device, the user interface data configured to describe application of the rules, and the one or more interactive user interfaces comprising a plurality of panes associated with respective categories each having corresponding logical conditions met, wherein the plurality of panes are ordered according to respective impacts on the credit score of the user, wherein each pane associated with a respective category is configured to alternatively depict (i) a first visual indicator including:
a description of the logical condition associated with the respective category,
an indication of whether the description indicates a positive or negative impact on the credit score of the user, and
a first value including or based on category data associated with the respective category, or (ii) a second visual indicator including informational text indicating rationale for the indicated positive or negative impact on the credit score of the user, wherein the informational text is dynamically generated based on the first value;

wherein the user interface data is further configured to, in response to receiving a touch input of a particular pane on the touch sensitive computing device:

cause the one or more interactive user interfaces to display a visual animation depicting rotation of the pane upon a horizontal or vertical axis in order to alternate display of visual indicators depicted in the particular pane between the first visual indicators and the second visual indicators displayed in the particular pane, such that visuals indicators displayed in the particular pane are alternated in response to each touch input on the particular pane.

2. The non-transitory computer storage of claim 1, wherein the first visual indicators further comprise an indicator that the user has achieved a predefined status with respect to the respective category.

3. The non-transitory computer storage of claim 1, wherein the informational text comprises text generated based on the first value.

4. The non-transitory computer storage of claim 1, wherein the informational text is received from a web server.

5. The non-transitory computer storage of claim 4, wherein the informational text is received from the web server asynchronously.

6. The non-transitory computer storage of claim 1, wherein the rules stored in the data structure are updated periodically, or wherein updates to the rules are checked for each access to the data structure.

7. A computerized method comprising:
by one or more hardware computer processors:
receiving first consumer credit information associated with a consumer, wherein the first consumer credit information comprises summary data associated with categories of credit information that impact a credit score of the consumer;

generating, for display on a touch sensitive computing device, a user interface comprising a plurality of panes associated with respective categories of credit information, wherein each pane is configured to alternatively depict (i) first visual indicators including respective indications of whether credit information of the consumer in a respective category positively or negatively impacts the credit score of the consumer, a description of first consumer credit information associated with the respective category, and a first value based on a consumer's credit information in the respective category, or (ii) second visual indicators including informational text indicating rationale for adjustments to credit scores in response to credit information associated with the respective category;

in response to receiving a touch input of a particular pane on the touch sensitive computing device, displaying a visual animation depicting rotation of the pane upon a horizontal or vertical axis in order to alternate display of visual indicators depicted in the particular pane between the first visual indicators and the second visual indicators displayed in the particular pane, such that visuals indicators displayed in the particular pane are alternated in response to each touch input on the particular pane.

8. The computerized method of claim 7, further comprising, by one or more hardware computer processors: receiving second credit information relating to a plurality of consumers with credit scores above a predetermined threshold, wherein the received second credit information comprises summary data of the plurality of consumers associated with the categories of credit information; and generating, for display on each pane, a comparison of a second value to the first value, the second value comprising summary information for the respective category.

9. The computerized method of claim 7, wherein the first visual indicators further comprise an indicator that the consumer has achieved a predefined status with respect to the respective category.

10. The computerized method of claim 7, wherein the informational text comprises text generated based on the first value.

11. The computerized method of claim 7, wherein the informational text is received from a web server.

12. The computerized method of claim 11, wherein the informational text is received from the web server asynchronously.

13. A touch sensitive computing device comprising:
one or more hardware processors configured to cause the touch sensitive computing device to:
receive first consumer credit information associated with a consumer, wherein the first consumer credit information comprises summary data associated with categories of credit information that impact a credit score of the consumer;

generate, for display on a touch sensitive display of the touch sensitive computing device, a user interface comprising a plurality of panes associated with respective categories of credit information, wherein each pane is configured to alternatively depict (i) first visual indicators including respective indications of whether credit information of the consumer in a respective category positively or negatively impacts the credit score of the consumer, a description of first consumer credit information associated with the respective category, and a first value based on a consumer's credit information in the respective category, or (ii) second visual indicators including informational text indicating rationale for adjustments to credit scores in response to credit information associated with the respective category;

in response to receipt of a touch input of a particular pane on the touch sensitive display of the touch sensitive computing device, display a visual animation depicting rotation of the pane upon a horizontal or vertical axis in order to alternate display of visual indicators depicted in the particular pane between the first visual indicators and the second visual indicators displayed in the particular pane, such that visuals indicators displayed in the particular pane are alternated in response to each touch input on the particular pane.

14. The touch sensitive computing device of claim 13, wherein the one or more hardware processors are further configured to cause the touch sensitive computing device to:

receive second credit information relating to a plurality of consumers with credit scores above a predetermined threshold, wherein the received second credit information comprises summary data of the plurality of consumers associated with the categories of credit information; and generate, for display on each pane, a comparison of a second value to the first value, the second value comprising summary information for the respective category.

15. The touch sensitive computing device of claim 13, wherein the first visual indicators further comprise an indicator that the consumer has achieved a predefined status with respect to the respective category.

16. The touch sensitive computing device of claim 15, wherein the predefined status is equivalent to or exceeding a score master value in the respective category.

17. The touch sensitive computing device of claim 13, wherein the informational text comprises text generated based on the first value.

18. The touch sensitive computing device of claim 13, wherein the informational text is received from a web server.

* * * * *